United States Patent [19]

Kimura et al.

[11] Patent Number: 5,046,754

[45] Date of Patent: Sep. 10, 1991

[54] VEHICLE HEIGHT CONTROL DEVICE ADAPTED ALSO FOR OPERATION AFTER TURN OFF OF IGNITION SWITCH

[75] Inventors: Mayumi Kimura; Yasuhiro Ashida; Masami Ito, all of Toyota, Japan

[73] Assignee: Toyota Jidosha Kabushiki Kaisha, Toyota, Japan

[21] Appl. No.: 521,544

[22] Filed: May 10, 1990

[30] Foreign Application Priority Data

May 13, 1989 [JP] Japan .................................. 1-119381
May 13, 1989 [JP] Japan .................................. 1-119382

[51] Int. Cl.⁵ .............................................. B60G 17/15
[52] U.S. Cl. .................................. 280/707; 364/424.05
[58] Field of Search ................... 364/424.05; 280/707, 280/702, 6.12, 840, DIG. 1

[56] References Cited

U.S. PATENT DOCUMENTS

| 4,349,077 | 9/1982 | Sekiguchi | 280/707 |
| 4,630,840 | 12/1986 | Masuda | 280/707 |
| 4,736,958 | 4/1988 | Armstrong | 280/840 |

FOREIGN PATENT DOCUMENTS

| 3820124 | 12/1988 | Fed. Rep. of Germany . | |
| 56-86808 | 7/1981 | Japan | 280/707 |
| 57-70903 | 4/1982 | Japan . | |
| 60-20710 | 10/1985 | Japan | 280/707 |
| 61-64006 | 5/1986 | Japan . | |
| 62-9123 | 3/1987 | Japan . | |
| 1-92921 | 4/1989 | Japan | 280/707 |
| 1-106720 | 4/1989 | Japan | 280/707 |

Primary Examiner—Charles A. Marmor
Assistant Examiner—Karin Tyson
Attorney, Agent, or Firm—Cushman, Darby & Cushman

[57] ABSTRACT

A vehicle height control device is adapted to operate even after turning off of the engine ignition switch within a first period only for lowering vehicle height when it exceeds a limit value which is higher than a limit value normally employed for vehicle height lowering control when the ignition switch is turned on, toward a limit value which is higher than the above second-mentioned limit value and further, such a vehicle height lowering control after ignition turn off is carried out, if a door or the trunk of the vehicle is open during the first period, after the door or the trunk has been closed within a second period longer than the first period.

4 Claims, 15 Drawing Sheets (a)

(b)

VEHICLE HEIGHT CONTROL DEVICE ADAPTED ALSO FOR OPERATION AFTER TURN OFF OF IGNITION SWITCH

BACKGROUND OF THE INVENTION

1. Field of the Invention

The present invention relates to a vehicle height control device which carries out vehicle height control satisfactorily when the ignition switch is turned off.

2. Description of the Prior Art

The function of a vehicle height control device is to maintain the vehicle height at a constant value, even though the load on the vehicle changes as passengers get in or out, and generally is constructed to control the vehicle height to be within a certain range by detecting the vehicle height, then lowering the vehicle body if the detected vehicle height exceeds a certain upper limit, and raising the vehicle body if the vehicle height falls below a certain lower level.

However, in order to carry out vehicle height control in this way, electric power is required to drive the vehicle height adjustment mechanism which raises and lowers the vehicle body, and therefore if vehicle height control is carried out when the engine is stopped and can not recharge the battery which forms the electric power supply for the vehicle, battery power will be consumed, and the engine may not be able to be restarted.

In answer to this, it has been conventionally proposed, for example in Japanese Utility Model Laying Open Publication Sho 61-64006 (1986), that in view of the fact that vehicle height control with the ignition off is likely to be required as passengers get out of the vehicle after the ignition is switched off, only the vehicle body lowering control which requires no electric power supply for the compressor system should be carried out within a fixed period, and once the fixed period has elapsed after the ignition is turned off, that the lowering control should also be stopped.

In the above prior art, however, the vehicle height control decision after the ignition switch is turned off is made using the same upper limit value as was used for the vehicle body lowering control while the ignition switch was turned on, so that the vehicle body is lowered as the vehicle height exceeds this limit when for example passengers get out of the vehicle, and the vehicle height is controlled so as not to exceed this upper limit. Therefore, when, after the control has stopped, the load on the vehicle body is increased as passengers get into the vehicle or goods are loaded, there is a problem that the vehicle sinks too low, and the vehicle body comes to rest on protrusions in the road surface such as curbstones, causing damage to the vehicle body.

Further, on the other hand, since the vehicle height control is carried out by raising and lowering the vehicle body according to variations in the vehicle height, if the vehicle height control is carried out while a passenger door or the trunk is open with the load on the vehicle being fluctuating, then vehicle height control will be carried out each time when the load on the vehicle body changes, and therefore the vehicle body will be raised and this unnecessary control, it has already been considered, as disclosed in for example Japanese Utility Model Publication Sho 62-9123 (1987), to suspend the execution of vehicle height control while a passenger door or the trunk is open.

In view of this it would be considered to combine these techniques in order to even further restrict the power consumption from the battery when the ignition switch is being off. In other words, by carrying out vehicle height control when the ignition switch is off for only a fixed period after the ignition switch is turned off, and also by suspending the vehicle height control after the ignition switch turn off if a door or the trunk is open so that power consumption due to unnecessary vehicle height control carried out while a door and/or the trunk is open can be restricted.

However, if the above techniques are simply combined, if a door or the trunk is left open for a long time, then vehicle height control may not be able to be carried out satisfactorily. In other words, if vehicle height control with the ignition switch being turned off is simply restricted to a fixed period after the ignition switch is turned off, if the door or the trunk is left open for a long time, then it may become impossible for the vehicle height control being carry out, or vehicle height control may be ended before it is completed, and it may not be possible for the vehicle height being adjusted to a target value after the ignition switch has been turned off.

In order to be able to carry out vehicle height control even when a door or the trunk is left open for a long time, it would be considered to lengthen the period after the ignition switch is turned off for which control is carried out, but if the control execution period is simply lengthened, it is no longer possible to achieve the original object of applying a time limit, that is to restrict the battery power consumption by making vehicle height control with the ignition switch off possible only for a period normally required for passengers to get out of the vehicle and so forth, and thus the power consumption due to the vehicle height control device would be increased.

SUMMARY OF THE INVENTION

In view of the above problems concerned with the vehicle height control in relation with the turning off of the engine ignition switch, it is a primary object of the present invention to provide a vehicle height control device which carries out vehicle body lowering control after engine ignition is switched off so that excessive lowering of the vehicle body would not occur the load on the vehicle body is increased after the control has ended.

Further, it is a secondary object of the present invention to provide a vehicle height control device which is further able to take it into consideration for the vehicle height control whether a door or the trunk is opened just before or after the turning off of the ignition switch but is closed within a reasonable period so as to be able to accomplish a vehicle height control while restricting the power consumption due to the vehicle height control within an allowable limit.

According to the present invention the above-mentioned primary object is accomplished by a vehicle height control device including a vehicle height adjustment means disposed between a vehicle body and a vehicle wheel to be capable of raising and lowering the body relative to the wheel for adjustment of vehicle height. The device also includes a vehicle height detection means for detecting the vehicle height of the body relative to the wheel and a switch state detection means for detecting on and off states of an ignition switch of the vehicle. A operation control means then operates the vehicle height adjustment means so that, when the ignition switch is detected as being in the on state by said switch state detection means, the vehicle height detected by said vehicle height detection means is within a range of vehicle height determined by a first upper and a first lower limit. Further, when the ignition switch is detected as being in the off state by said switch state detection means, within a first period thereafter, the vehicle height detected by said vehicle height detection means is lowered if it is higher than a second predetermined upper limit value which is higher than said first upper limit value.

Further, the above-mentioned secondary object is accomplished by a vehicle height control device as described above, further comprising an open and closed state detection means which detects open and closed states of an opening and closing member for selectively communicating interior and exterior of the vehicle, wherein said operation control means suspends operation of said vehicle height adjustment means when said open and closed states detection means is detecting an open state of said opening and closing member, and operates said vehicle height adjustment means, when thereafter said open and closed state detection means detects a closed state of said opening and closing member within a second period which is longer than said first period from an instant of switching off of the ignition switch, so that the vehicle height detected by said vehicle height detection means is lowered if it is higher than said second upper limit value.

According to the vehicle height control device of the present invention, since when the ignition switch is turned off the vehicle height control is carried out only when the vehicle height exceeds a second upper limit value higher the upper limit value of the target vehicle height used when carrying out the vehicle height control when the ignition switch is turned on, and therefore after the vehicle height control with the ignition switch being off has ended, excessive reduction of the vehicle height can be prevented when the load on the vehicle is increased, and the vehicle body can be protected from projections in the road surface such as curbstones. Further, since the vehicle height control with the ignition switch being off is not carried out until the vehicle height reaches such a higher upper limit, as compared with a conventional device in which the vehicle height control starts after the ignition is turned off by using the same upper limit as in the vehicle height control while the ignition switch is turned on, the frequency of carrying out the vehicle height control while the ignition switch is off is reduced, and the power consumption while the ignition is off is also reduced.

Further, according to said further modification, when the ignition switch is turned off, within a certain decision period after the turning off of the ignition switch, a decision is made as to whether or not vehicle height control starting conditions hold, and when the vehicle height control starting conditions hold, the vehicle height control is carried out on the condition that an opening and closing member such as a door or the trunk is closed, and that a set period which is longer than the decision period for the control starting conditions has not yet elapsed after the ignition was turned off, and furthermore, when the vehicle height has been controlled to the target vehicle height by this vehicle height control, or when the set period has elapsed after the ignition was switched off, the vehicle height control is ended. Therefore, according to the vehicle height control device of the present invention, frequent execution of unnecessary vehicle height control when an opening and closing member is open and the consequent large power consumption can be prevented, and even when the opening and closing member is open for a longer time than the decision period, vehicle height control can be carried out, and the vehicle body attitude improved. Furthermore, after the decision period has elapsed, the determination of vehicle height control starting conditions is not carried out, and moreover, vehicle height control is not carried out after the vehicle height has been controlled to the target vehicle height, as a result of which the amount of electrical energy consumed after the decision period has elapsed for the vehicle height to be controlled to the target vehicle height is restricted to the minimum necessary. Furthermore, in the event that the state in which an opening and closing member is open persists for a long time, such as when the shutting of an opening and closing member is forgotten, the control can be terminated, and thereby the power consumption of the device can be reduced.

BRIEF DESCRIPTION OF THE DRAWINGS

In the accompanying drawings.

DESCRIPTION OF THE PREFERRED EMBODIMENTS

In the following the invention will be described in more detail with respect to some preferred embodiments.

Figure 1:
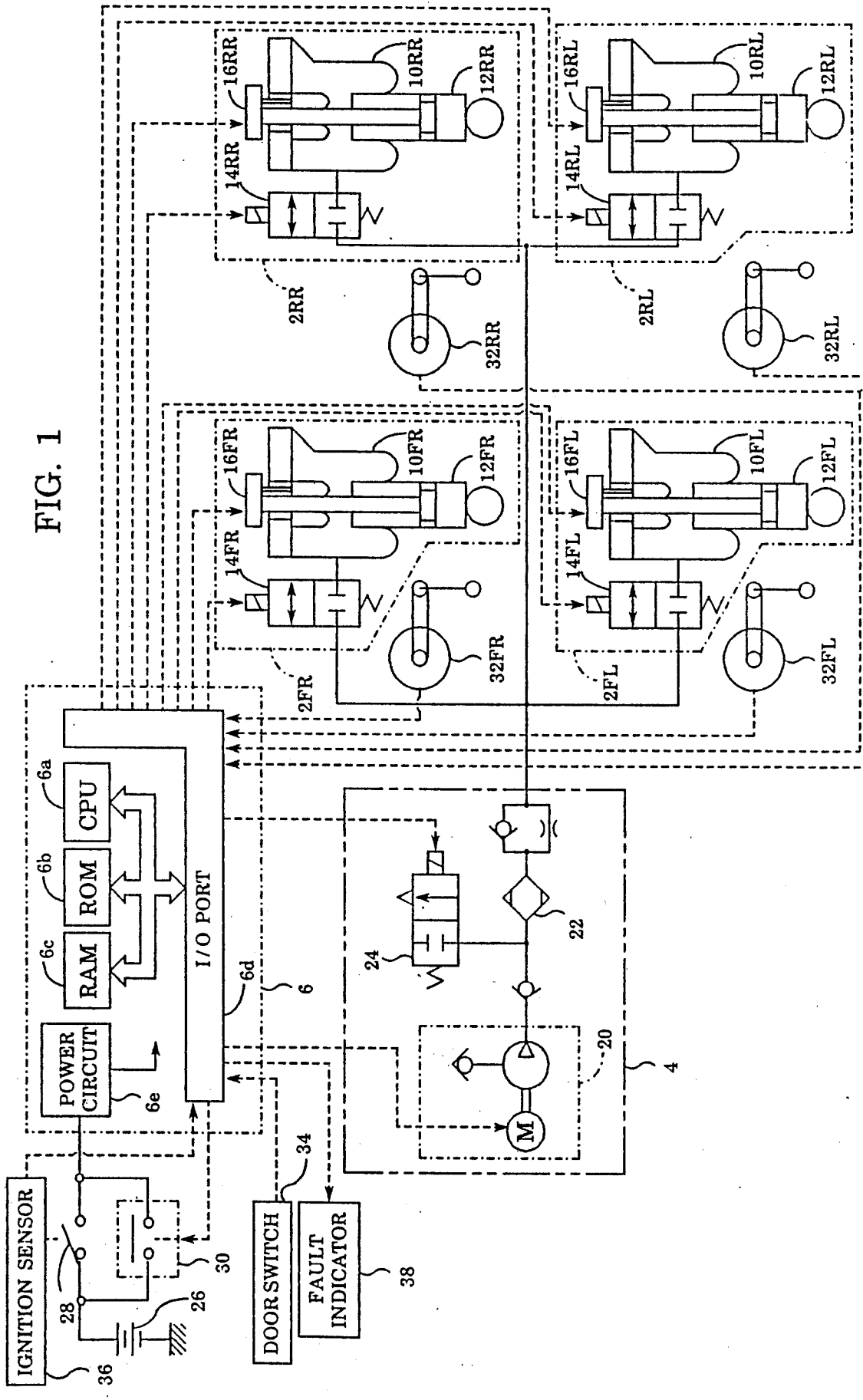
FIG. 1 is a schematic structural diagram showing the structure of an embodiment of the vehicle height control device in which the present invention is incorporated.

As shown in FIG. 1, the vehicle height control device in which the present invention is incorporated has as principal constituents air suspension units 2FL, 2FR, 2RL and 2RR, disposed between the vehicle body and front and rear and left and right vehicle wheels, a compressed air supply system 4 supplying and exhausting air to each of these air suspension units 2FL, 2FR, 2RL and 2RR, and an electronic control circuit 6 corresponding to the operation control means controlling these items. Here the two-letter appellations FL, FR, RL and RR attached to the air suspension units 2 indicate the front left wheel, front right wheel, rear left wheel, and rear right wheel respectively, and in the explanation below will be attached to reference numerals for all elements provided for each vehicle wheel.

The air suspension units 2FL, 2FR, 2RL and 2RR are constructed respectively from variable volume type air chambers 10FL, 10FR, 10RL and 10RR capable of vehicle height adjustment, shock absorbers 12FL, 12FR, 12RL and 12RR of variable elastic constant and damping force type, vehicle height adjustment valves 14FL, 14FR, 14RL and 14RR which open and close air passages from the compressed air supply system 4 to the air chambers 10FL, 10FR, 10RL and 10RR, and actuators 16FL, 16FR, 16RL and 16RR which change the elastic constant and damping force of the shock absorbers 12FL, 12FR, 12RL and 12RR.

The compressed air supply system 4 comprises a compressor with motor 20 which produces the compressed air needed to raise the vehicle body, a dryer 22 which absorbs moisture from the compressed air, and an air solenoid valve 24 which exhausts compressed air from the air chambers 10FL, 10FR, 10RL and 10RR of the air suspension units 2FL, 2FR, 2RL and 2RR.

Therefore, in the present embodiment, when the air solenoid valve 24 is shut off, and the vehicle height control valves 14FL, 14FR, 14RL and 14RR of the air suspension units 2FL, 2FR, 2RL and 2RR are open, compressed air is supplied from the compressor with motor 20 through the dryer 22 to the air chambers 10FL, 10FR, 10RL and 10RR and thereby the vehicle height in each wheel position can be increased, whereas when the air solenoid valve 24 is opened and the vehicle height control valves 14 are open, compressed air within the air chambers 10FL, 10FR, 10RL and 10RR is exhausted through the air solenoid valve 24, and thereby the vehicle height in each wheel position can be decreased.

The valves used for the air solenoid valve 24 and the vehicle height control valves 14FL, 14FR, 14RL and 14RR of the air suspension units 2FL, 2FR, 2RL and 2RR are of the normally closed type, which are closed until being electrically energized to switch to the open position, and when control is stopped the air chambers 10FL, 10FR, 10RL and 10RR are in a tightly closed state. In this embodiment the elements used to increase and decrease the vehicle height, that is the air chambers 10FL, 10FR, 10RL and 10RR within the air suspension units 2FL, 2FR, 2RL and 2RR, the vehicle height control valves 14FL, 14FR, 14RL and 14RR and the compressed air supply system 4 correspond to the vehicle height adjustment means described above.

The function of the electronic control circuit 6 is to control the opening and closing of the air solenoid valve 24 and the vehicle height control valves 14FL, 14FR, 14RL and 14RR as described above, so that the vehicle height can be controlled to be a target vehicle height, and is constructed from well known logic and computation circuits, principally a CPU 6a, ROM 6b, and RAM 6c. The electronic control circuit 6 also controls the driving of the actuators 16FL, 16FR, 16RL and 16RR to change the elastic constant and damping force of the shock absorbers 12FL, 12FR, 12RL and 12RR, but since this control is conventionally well known, and has no particular relevance to the present invention, it is not described further here.

The electronic control circuit 6 is provided with an I/O port 6d which has circuits for communicating with external devices, such as driver circuits for driving the air solenoid valve 24 and the vehicle height control valves 14FL, 14FR, 14RL and 14RR, and input circuits for accepting signals from the sensors described below which detect the state of the vehicle, and also a power supply circuit 6e which takes power from the battery 26 and produces the voltage required to drive the control circuit 6.

An ignition switch 28 is provided in the power line connecting the power supply circuit 6e to the battery 26, and when the ignition switch 28 is on, that is while the vehicle engine is running, the electronic control circuit 6 is able to operate. A relay switch 30 is provided in parallel with the ignition switch 28, and when the ignition switch 28 is on, this relay switch 30 is turned on by the electronic control circuit 6 so that even after the ignition switch 28 is turned off the electronic control circuit 6 can keep itself in an operable state.

Additionally the vehicle height control device is provided with the following sensors to detect the vehicle state: vehicle height sensors 32FL, 32FR, 32RL and 32RR which are disposed between the vehicle body and the corresponding vehicle wheel (or actually an element at the bottom of the spring which supports the wheel), detecting the vehicle height at each vehicle wheel position, and which correspond to the vehicle height detection means; and an ignition sensor 36 which detects whether the ignition switch 28 is on or off, and which corresponds to the switch state detection means. Signals from these sensors are input to the electronic control circuit 6 through the I/O port 6d.

This vehicle height control device is also provided with a fault indicator lamp 38 which indicates faults in the vehicle height sensors 32FL, 32FR, 32RL and 32RR, and if the electronic control circuit 6 detects a sensor fault based on the output signals from the vehicle height sensors 32FL, 32FR, 32RL and 32RR, it is able to indicate this by turning on the fault indicator lamp 38 through the I/O port 6d.

Figure 2:
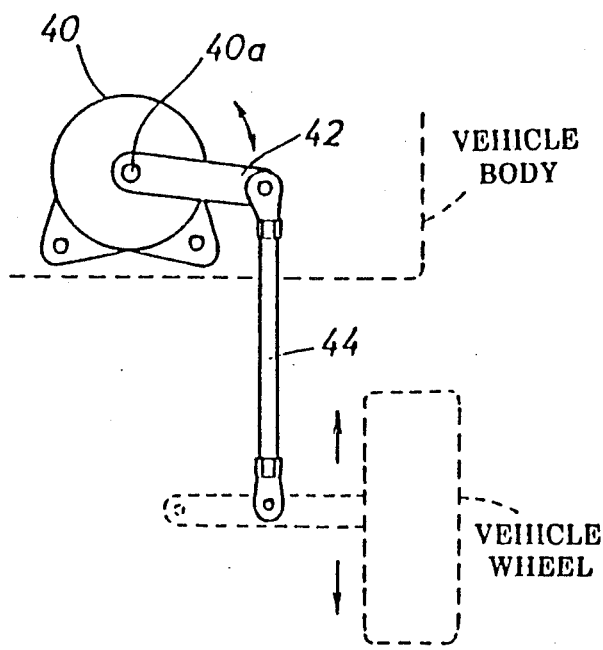
FIGS. 2 (a) and (b) are diagrammatical views of the construction of the vehicle height sensor.
Figure 2:
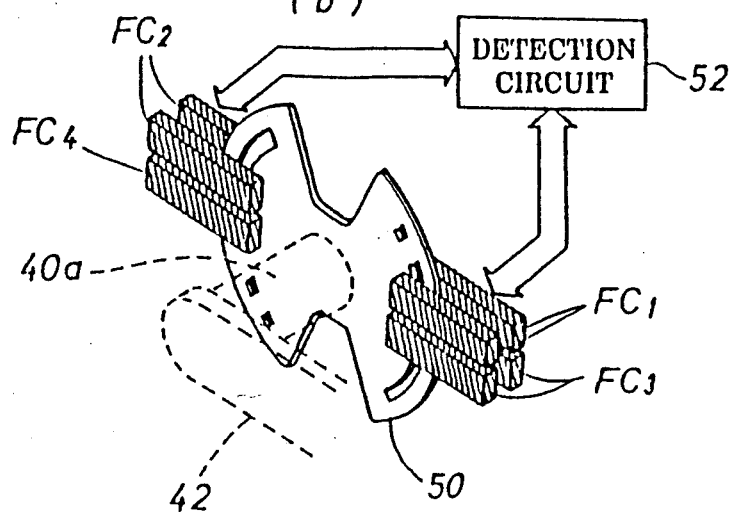

As shown in FIG. 2(a), each of these vehicle height sensors 32FL, 32FR, 32RL and 32RR comprises a sensor body 40, an arm 42 connected to a shaft 40a projecting from the sensor body 40, and a rod 44 connected rotatably to the end of the arm 42; the sensor body 40 is fixed to the vehicle body, and the end of the rod 44 opposite to the arm 42 is fixed to an element at the bottom of the spring, such as a suspension arm or stabilizer, so that the vehicle height can be detected. Thus in this way the rod 44 will move up and down according to the distance between the vehicle body and the vehicle wheel (that is the vehicle height), and this movement will be transmitted by the arm 42 to the shaft 40a; as the shaft 40a rotates each of the vehicle height sensors 32FL, 32FR, 32RL and 32RR will be able to detect the vehicle height within the sensor body 40 by detecting the rotary position of the shaft 40a.

Furthermore, as shown in FIG. 2(b), in order to detect the vehicle height in this way, within the sensor body 40 are provided four photo-couplers FC1 to FC4, a slotted plate 50 which is fixed to the shaft 40a, and has slots formed in it to turn on and off the photo-couplers FC1 to FC4 according to the rotation of the shaft 40a (that is the vehicle height), and also a detection circuit 52 which drives the photo-couplers FC1 to FC4, and produces signals which indicate the vehicle height and also sensor faults.

Figure 3:
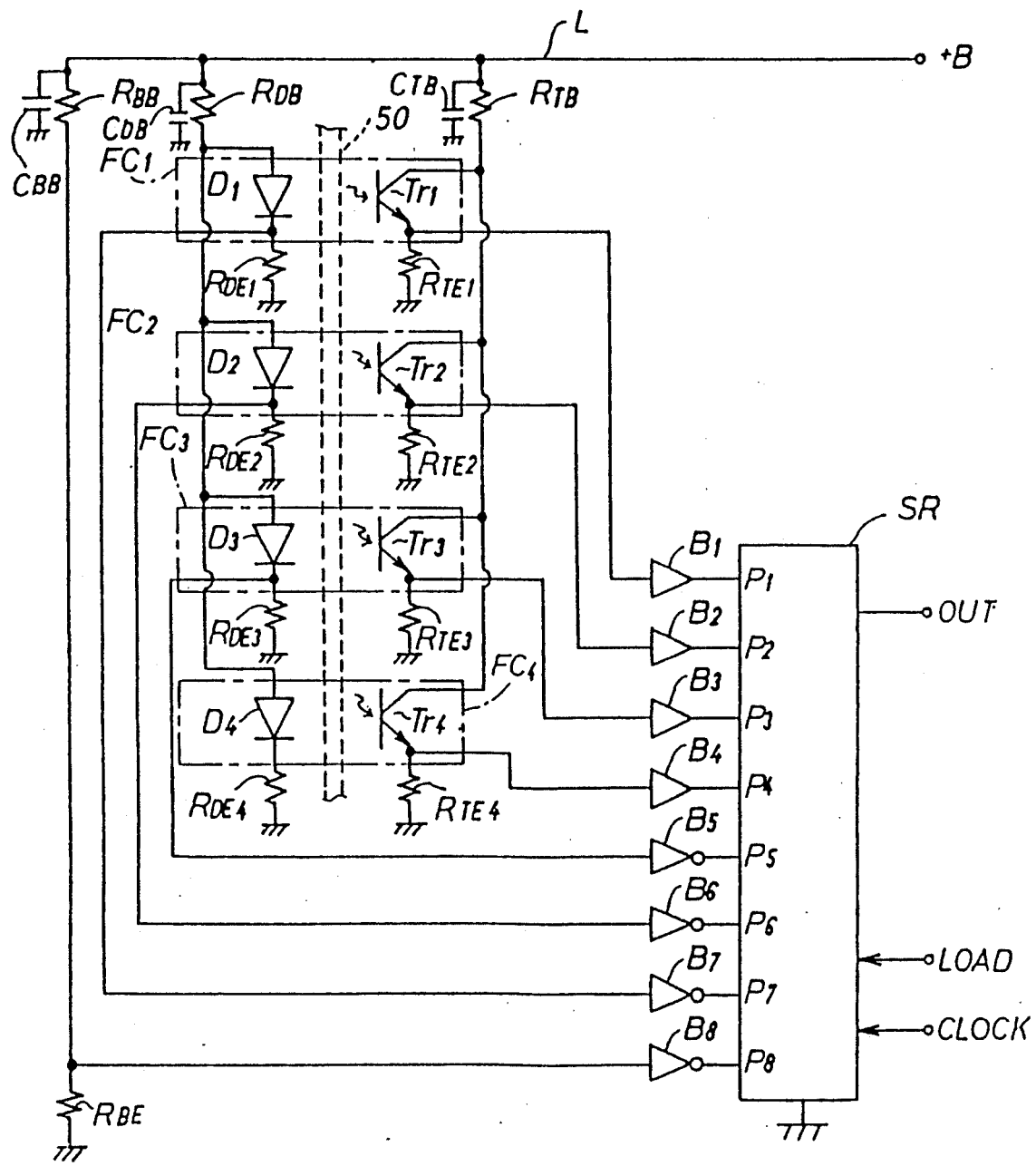
FIG. 3 is a circuit diagram of the detection circuit provided in the vehicle height sensor.

This detection circuit 52 is constructed as shown in FIG. 3.

As shown in FIG. 3, each of the photo-couplers FC1 to FC4 is constructed from a corresponding light emitting diode D1 to D4 and photo-transistor Tr1 to Tr4, and if the beam of light from the light emitting diode D1 to D4 is shut off by the slotted plate 50 the photo-transistor Tr1 to Tr4 is turned off, whereas if the beam of light from the light emitting diode D1 to D4 is allowed to pass through a slot in the slotted plate 50 the photo-transistor Tr1 to Tr4 is turned on.

In the detection circuit 52, grounding resistors RDE1 to RDE4 and RTE1 to RTE4 are provided to limit the current flowing through the light emitting diodes D1 to D4 and photo-transistors Tr1 to Tr4, and by applying the battery voltage +B through a power line L to the light emitting diodes D1 to D4 and photo-transistors Tr1 to Tr4, the light emitting diodes D1 to D4 are caused to emit light, and thus a current flows through each of the photo-transistors Tr1 to Tr4 when they get light through a slot formed in the slotted plate 50 from the light emitting diodes D1 to D4.

In the power line L supplying the battery voltage +B to the light emitting diodes D1 to D4 and to the photo-transistors Tr1 to Tr4 are provided filter circuits comprising respective capacitors CDB and CTB each of which has one end grounded and respective resistors RDB and RTB connected in series with the power line L, and these remove noise components carried by the power line L.

The detection circuit 52 is also provided with a shift register of conventional type, which gets an external load signal LOAD, and reads in the signal levels (High/Low) from input terminals P1 to P8, and outputs these signal levels while shifting, according to an external clock signal CLOCK.

Input terminals P1 to P4 are connected through buffers B1 to B4 to the positive terminals of the grounding resistors RTE1 to RTE4 of the photo-transistors Tr1 to Tr4. Therefore the potentials of the input terminals P1 to P4 are high when the respective photo-transistors Tr1 to Tr4 (in other words photo-couplers FC1 to FC4) are on, and a current is flowing through the respective grounding resistors RTE1 to RTE4, and are low when the respective photo-transistors Tr1 to Tr4 are off, and no current is flowing through the respective grounding resistors RTE1 to RTE4. Therefore the voltage levels on these input terminals P1 to P4 are signal levels indicating the on/off states of the photo-couplers FC1 to FC4, and thus 4 bits of vehicle height data indicating 16 levels are obtained.

The input terminals P5 to P7 of the shift register SR are connected through inverter circuits constituting buffers B5 to B7 to the positive terminals of the grounding resistors RDE1, RDE2 and RDE3 of the light emitting diodes D1, D2 and D3. Since the light emitting diodes D1, D2 and D3 are constantly connected to the battery voltage +B, when the light emitting diodes D1. D2 and D3 are operating normally (that is, are emitting light), a current will be flowing through the grounding resistors RDE1, RDE2 and RDE3, and therefore the potentials of the input terminals P5 to P7 will be low, whereas when they are not operating normally, no current will flow through the grounding resistors RDE1, RDE2 and RDE3, and therefore the potentials of the input terminals P5 to P7 will be high. Therefore the voltage levels on these input terminals P5 to P7 are signal levels indicating whether the light emitting diodes D1, D2 and D3 are working normally or have failed, and thus the sensor is able to obtain data indicating a sensor failure.

It should be noted that of the four light emitting diodes D1 to D4 with which the sensor is equipped, fault detection is only provided for the three light emitting diodes D1, D2 and D3, because in this embodiment the photocoupler FC4 including the light emitting diode D4 is allocated to the least significant bit of the 4 bit vehicle height data, and therefore although if the light emitting diode D4 fails the resolution of the vehicle height detection data will be reduced, there will not be any very large loss of accuracy in carrying out vehicle height control.

Finally input terminal P8 of the shift register SR is connected through a buffer B8 to the intermediate point of voltage dividing resistors RBB and RBE which divide the voltage +B of the battery, so that the potential on the input terminal P8 will be always high. It should be noted that a capacitor CBB has one end connected to the power line L side of the voltage dividing resistor RBB, and this capacitor CBB, together with the voltage dividing resistor RBB, forms a filter circuit which removes noise components carried by the power line L.

Thus since the input terminals P1 to P8 of the shift register SR are supplied with 4 bits of vehicle height data, fault data indicating whether the vehicle height sensor has failed, and a constant high level signal, by inputting the load signal LOAD and then the clock signal CLOCK in turn to the shift register SR, the vehicle height data, fault data, and constant data are output in turn as serial data from the shift register SR.

Thus the electronic control circuit 6 outputs the load signal LOAD and clock signal CLOCK to the vehicle height sensors 32FL, 32FR, 32RL and 32RR, causing the vehicle height sensors 32FL, 32FR, 32RL and 32RR to output serial data as described above, and reads in this data, whereby vehicle height and sensor faults are detected. Additionally, the last bit of the serial data output by the vehicle height sensors 32FL, 32FR, 32RL and 32RR (constant data) should always be high level, so that by determining whether or not this data is in fact high level the electronic control circuit 6 is able to check for breaks in the signal lines connecting the vehicle height sensors 32FL, 32FR, 32RL and 32RR to the electronic control circuit 6. In other words, the constant data is used to detect breaks in the signal lines, and if this data should be low level, which should never occur, there will be determined to be a break in a signal line between the sensors and the control circuit, and the data from the sensors will be regarded as not usable.

Figure 5:
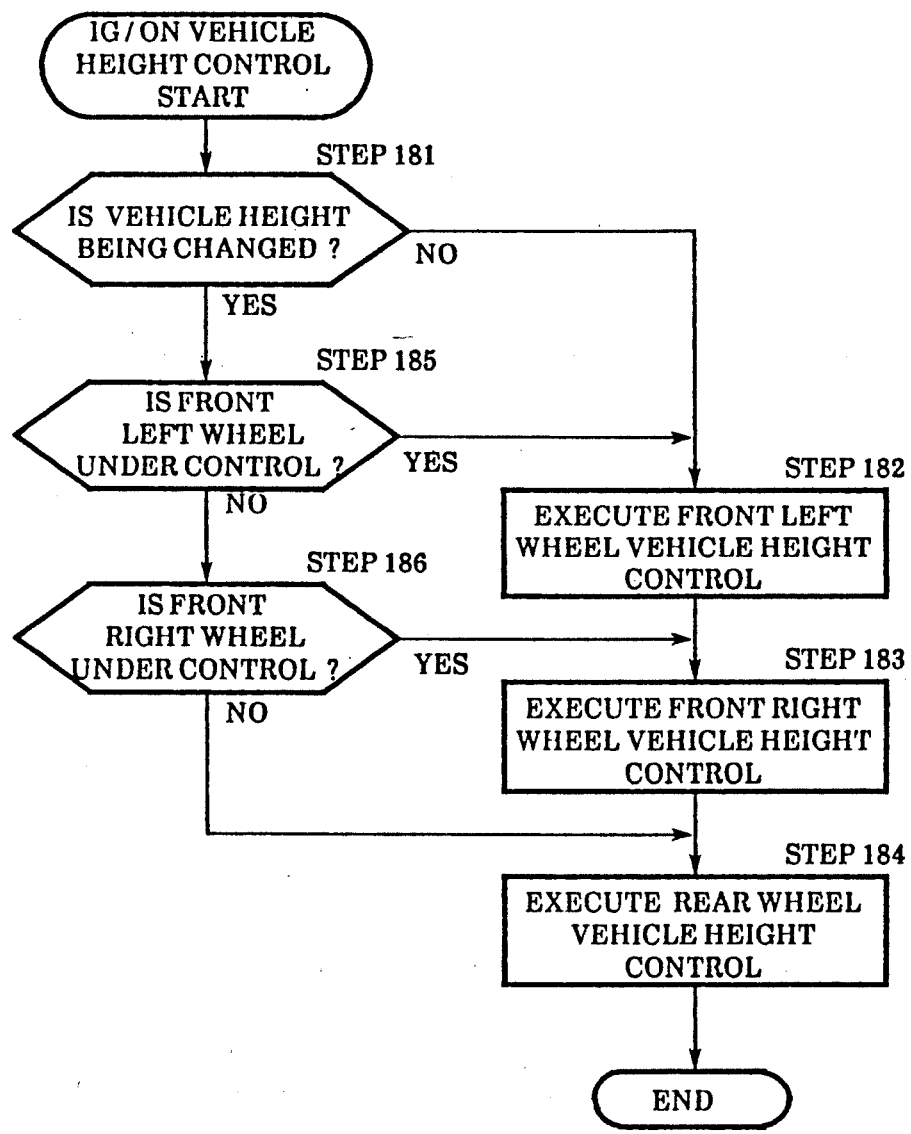
FIGS. 5 (a) and (b) are flowcharts explaining the IG/ON vehicle height control processing carried out in step 180 in FIG. 4.
Figure 5:
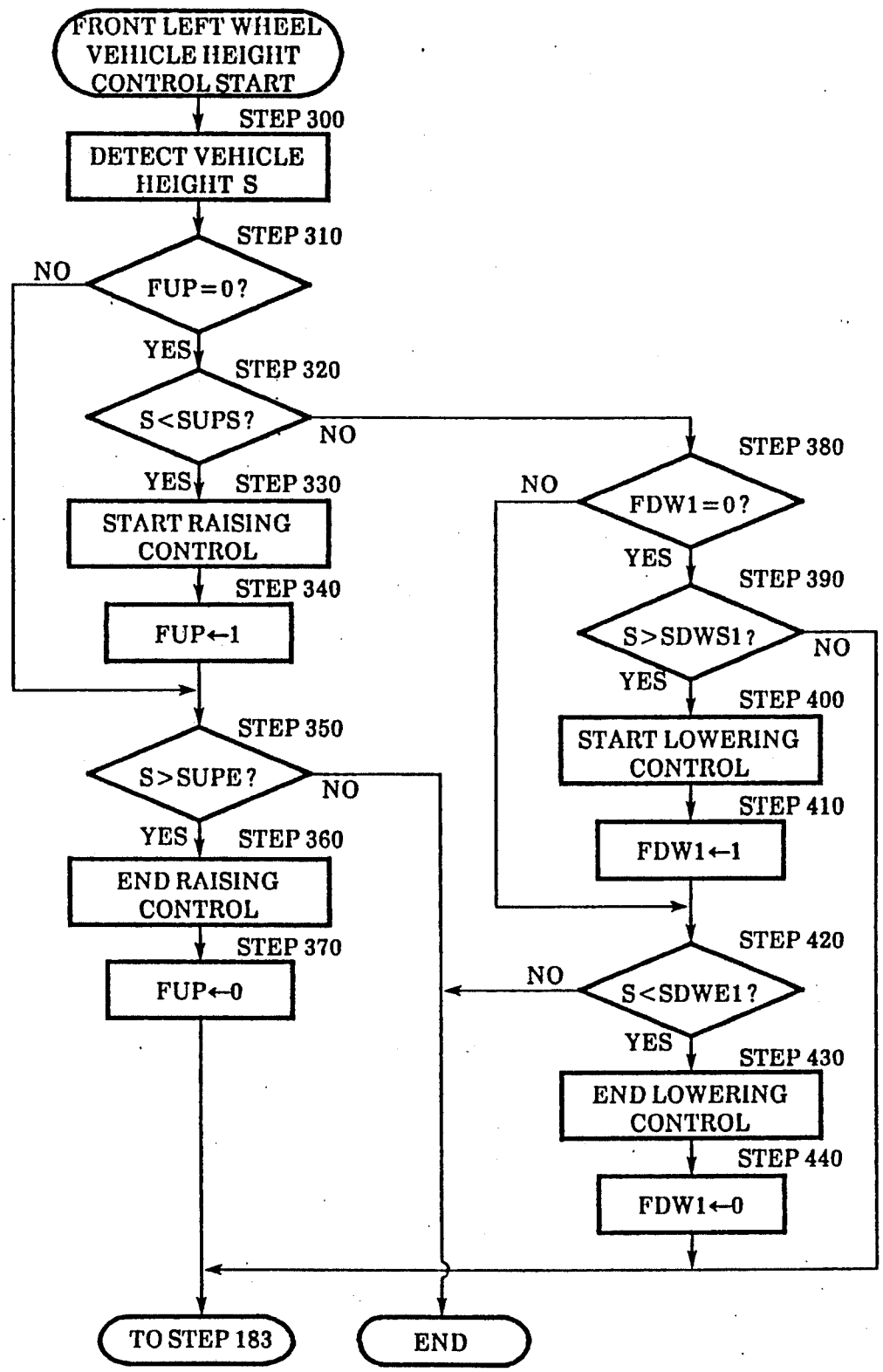
Figure 6:
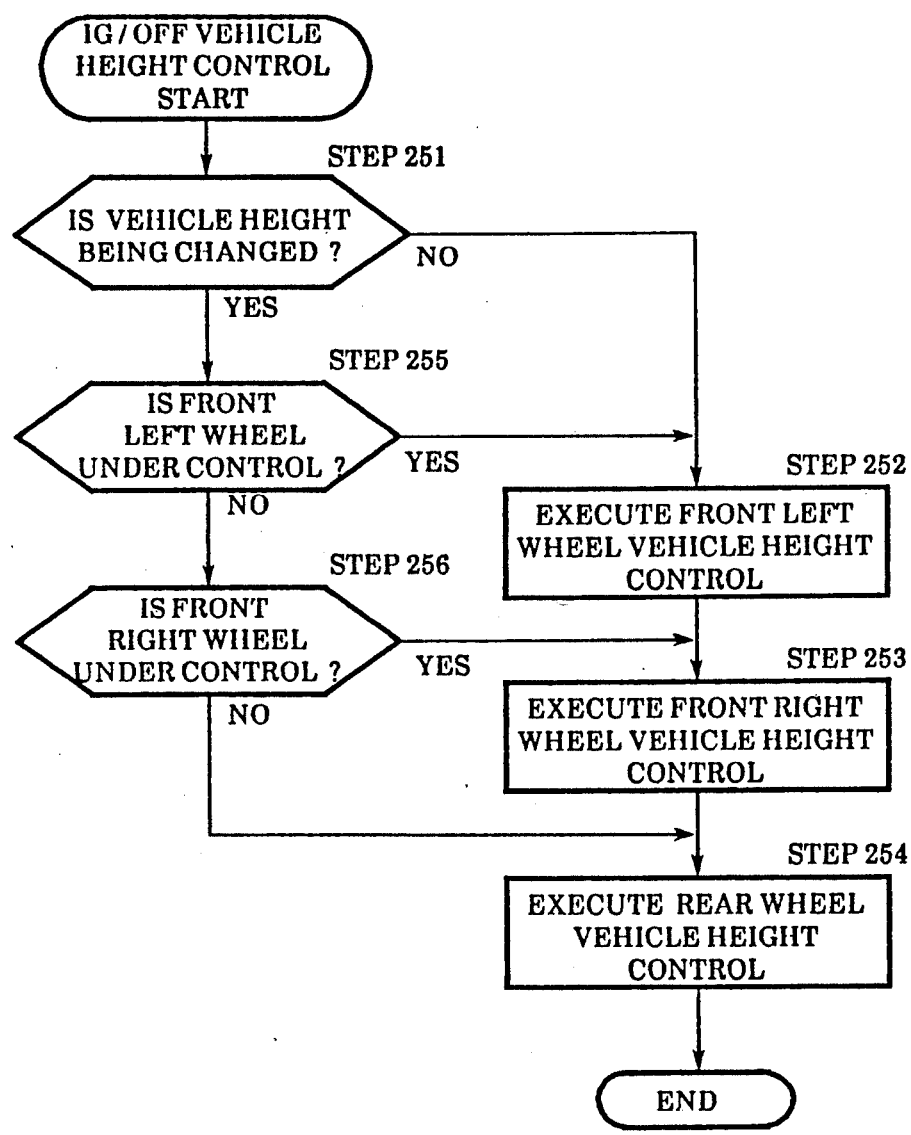
FIGS. 6 (a) and (b) are flowcharts explaining the IG/OFF vehicle height control processing carried out in step 250 in FIG. 4.
Figure 6:
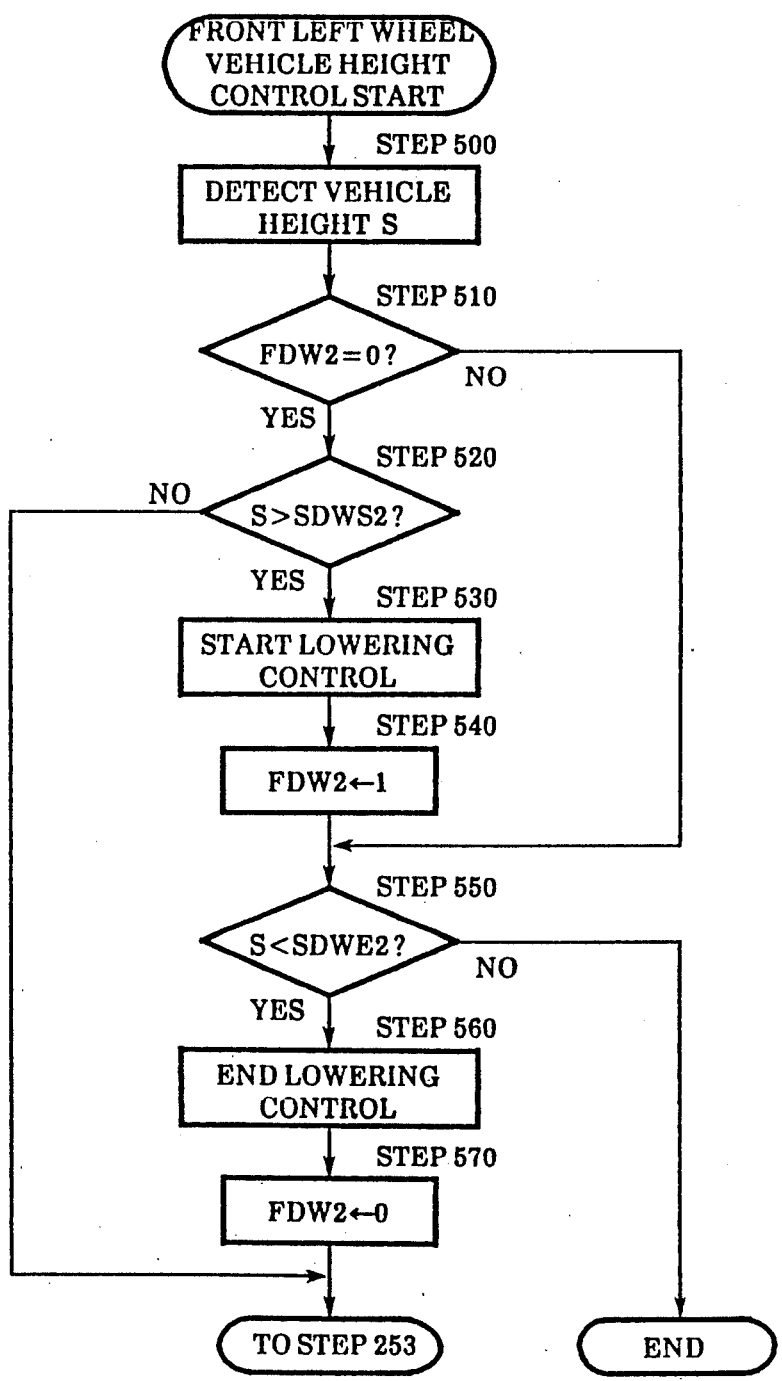

Next the vehicle height control processing carried out by the electronic control circuit 6 to control the vehicle height will be described based on the flowcharts in FIG. 4 to FIG. 6. The electronic control circuit 6 is started when the ignition switch 28 is turned on, and the power supply circuit 6e is supplied with power from the battery 26, and begins to produce the drive voltage; after starting, the relay switch 30 is turned on, and then vehicle height control is carried out.

Figure 4:
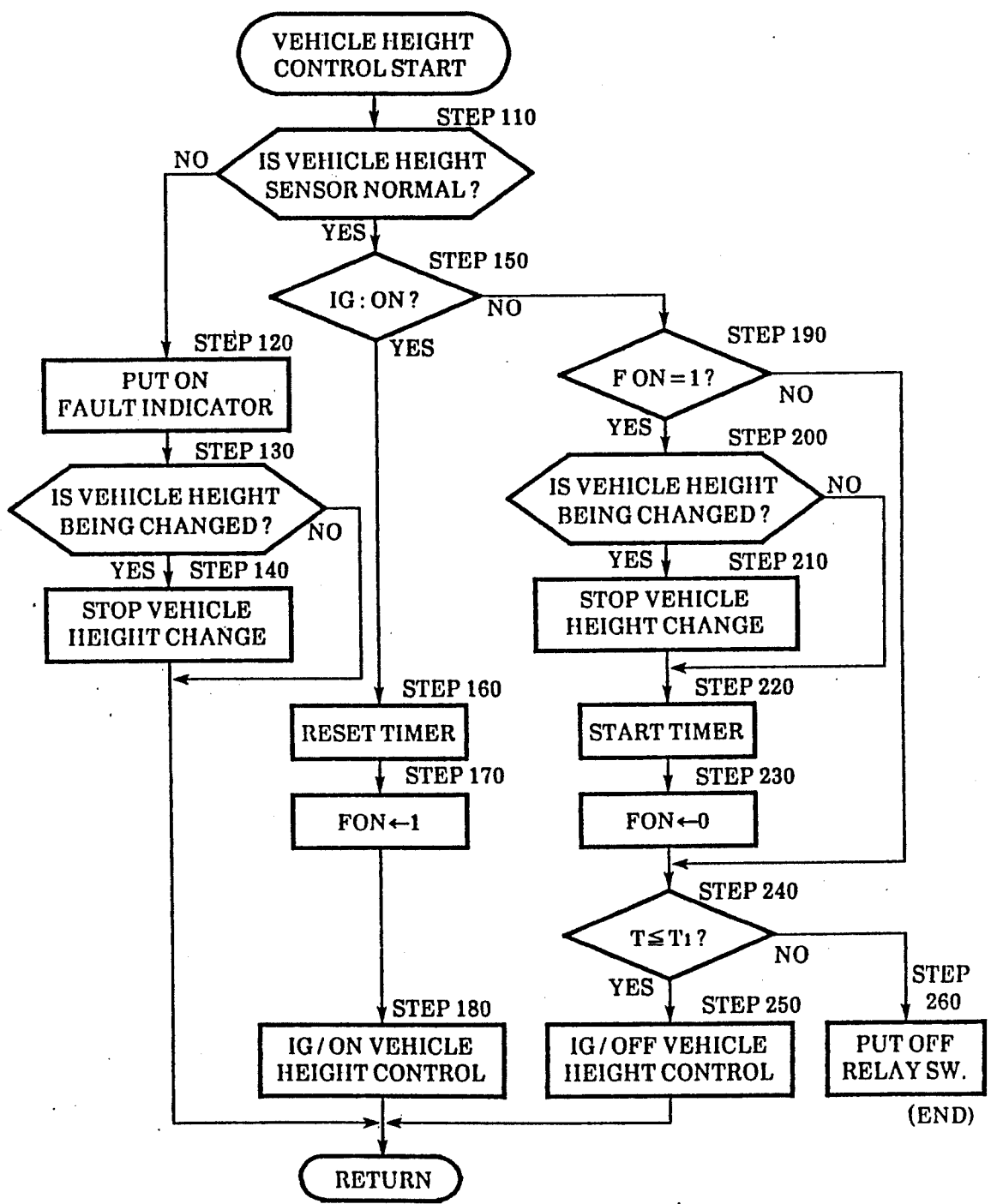
FIG. 4 is a flowchart explaining a first embodiment of the vehicle height control processing carried out in the electronic control circuit.

As shown in FIG. 4, when vehicle height control is started, first step 110 is executed, and a decision is made as to whether the vehicle height data obtained from the vehicle height sensors 32FL, 32FR, 32RL and 32RR is normal or not, or in other words based on the output data from the vehicle height sensors 32FL, 32FR, 32RL and 32RR, whether the light emitting diodes D1, D2 and D3 are functioning normally, and whether there are breaks in the signal lines. In step 110, if a decision is made that there is a fault in the vehicle height sensors 32FL, 32FR, 32RL and 32RR, control proceeds to step 120, and the fault indicator lamp 38 is turned on to indicate the result of this decision. Next in step 130, a decision is made as to whether or not the processing described below is currently being carried out to perform vehicle height control, and if vehicle height control is being carried out, since it is not possible to continue carrying out vehicle height control, control proceeds to step 140, and after vehicle height control halt processing to stop the vehicle height control which is currently being carried out, this processing is ended, whereas if vehicle height control is not being carried out, this processing is ended immediately.

On the other hand, when the decision in step 110 is that the vehicle height sensors 32FL, 32FR, 32RL and 32RR are normal, control proceeds to step 150, and a test is made as to whether or not the ignition switch 28 is on. If the ignition switch 28 is on, then in step 160 a timer T used to count elapsed time after the ignition switch 28 is turned off in the processing described below is cleared, next in step 170 a flag FON which indicates that the ignition switch 28 is on is set, and next in step 180 vehicle height control for when the ignition switch 28 is turned on (below this state is referred to as IG/ON), which is termed IG/ON vehicle height control processing, is carried out; this processing is then ended.

On the other hand, when a decision is made in step 150 that the ignition switch 28 is not turned on, control proceeds to step 190, and a decision is made as to whether or not the flag FON is set, that is whether the ignition switch 28 has been on up to now and the ignition switch 28 has immediately previously been switched from on to off.

In step 190, when a decision is made that the flag FON is set, that is that the ignition switch 28 has immediately previously been switched from on to off, control next proceeds to step 200, whereas in the contrary case control proceeds to step 240 described below.

Next in step 200, a decision is made as to whether or not vehicle height control is currently being carried out according to the IG/ON vehicle height control processing in step 180, and when vehicle height control is being carried out, in step 210 vehicle height control halt processing to stop this vehicle height control is carried out, and then control proceeds to step 220, whereas if vehicle height control is not currently being carried out control proceeds directly to step 220. In step 220 the timer T which was reset in step 160 when the ignition switch 28 was on, is started, and a count of the time elapsed after the ignition switch 28 was turned off is begun, then next in step 230 the flag FON is reset and then control proceeds to step 240.

In step 240 a decision is made as to whether the value of the above timer T, in other words the elapsed time T since the ignition switch 28 was turned off, is not more than a certain preset period T1 (for example 3 minutes). If T is not more than T1, control proceeds to step 250 where vehicle height control for when the ignition switch 28 is turned off (below this state is referred to as IG/OFF), which is termed IG/OFF vehicle height control processing, is carried out, and then this processing is ended, whereas if on the other hand T is more than T1, then by switching off the relay switch 30 which was turned on when starting up, the supply of power to the electronic control circuit 6 is cut off.

In other words, after the ignition switch 28 is turned off, until the period T1 has elapsed, IG/OFF vehicle height control is carried out, and after the period T1 has elapsed, the relay switch 30 is turned off, so that not only is the vehicle height control halted, but also the consumption of battery power by operation of the electronic control circuit 6 is prevented.

The IG/ON vehicle height control processing carried out in step 180 is done in such a way as to maintain a particular vehicle attitude, by controlling the mean vehicle height values of the front left wheel vehicle height, the front right wheel vehicle height and the rear wheel vehicle height to respective preset target value ranges, and as shown in FIG. 5(a), first in step 181 a decision is as to whether or not vehicle height control is currently being carried out, and if vehicle height control is not being carried out, vehicle height control processing is carried out in a predetermined order of priority (in the present embodiment in the sequence front left - front right - rear) (step 182, step 183 and step 184), whereas if vehicle height control is already being carried out, decisions are made as to which of the front left, front right and rear wheels vehicle height control is being carried out for (step 185 and step 186), and processing is carried out by going to the vehicle height control processing step for the wheel or wheels for which vehicle height control is being carried out.

As described in detail below, in the vehicle height control processing carried out in steps 182 to 184, when the vehicle height control is being carried out for a particular wheel or wheels, the IG/ON vehicle height control processing ends therewith, so that moving from step 182 to step 183 or from step 183 to step 184 occurs only when vehicle height control is not actually being carried out for the front left wheel or the front right wheel.

Next the vehicle height control processing for the respective wheels carried out in steps 182 to 184 is described, but since the vehicle height control processing carried out in these steps is the same except in so far as the wheel or wheels being controlled are different, here the front left wheel (FL) is taken as an example, and described with reference to the flowchart shown in FIG. 5(b).

As shown in FIG. 5(b), when the IG/ON vehicle height control processing for the front left wheel is started, first in step 300, based on the data detected by the vehicle height sensor 32FL, the vehicle height S at the front left wheel position is detected, and control proceeds to step 310. In step 310, a decision is made from the raising control flag FUP which is to be set in the processing below when vehicle body raising control is started as to whether vehicle body raising control is being carried out at present for the front left vehicle wheel. If the raising control flag FUP is in the reset state, and raising control of the vehicle body is not being carried out, then control proceeds to step 320, and a decision is made as to whether the vehicle height S detected in step 300 is below a raising control starting vehicle height SUPS which represents the lower limit of vehicle height for the control target.

If a decision is made in step 320 that the vehicle height S is below the raising control starting vehicle height SUPS, control proceeds to step 330, where the compressor with motor 20 is operated to produce compressed air, and the vehicle height control valve 14FL for the front left wheel is energized to open the valve, so that raising control to raise the vehicle body at the front left wheel is started, then next control proceeds to step 340 and the raising control flag FUP is set.

When the raising control flag FUP is set in step 340 in this way, or when a decision was made in step 310 that the raising control flag FUP was already set, control proceeds to step 350, and a decision is made as to whether the vehicle height S detected in step 300 is above a raising control ending vehicle height SUPE which is set to be somewhat higher than the raising control starting vehicle height SUPS. In step 350, if a decision is made that the vehicle height S is not more than the raising control ending vehicle height SUPE, in order that raising control is continued for the front left wheel, IG/ON vehicle height control processing is ended.

On the other hand, in step 350, if a decision is made that the vehicle height S has exceeded the raising control ending vehicle height SUPE, the conditions for ending vehicle height control of the front left wheel hold, and control proceeds to step 360, and the operation of the compressor with motor 20 and the energizing of the vehicle height control valve 14FL are stopped, whereby raising control is ended, and next in step 370 the raising control flag FUP is reset, after which control proceeds to the vehicle height control processing for the front right wheel in step 183.

Next, when in step 320 a decision is made that the vehicle height S is at least the raising control starting vehicle height, control proceeds to step 380, and a decision is made from the lowering control flag FDW1 which is to be set in the processing below when vehicle body lowering control is started as to whether vehicle body lowering control is being carried out at present for the front left vehicle wheel. If the lowering control flag FDW1 is in the reset state, and lowering control of the vehicle body is not being carried out, then control proceeds to step 390, and a decision is made as to whether the vehicle height S detected in step 300 is above a lowering control starting vehicle height SDWS1 which represents the upper limit of vehicle height for the control target, and if the vehicle height S does not exceed the lowering control starting vehicle height SDWS1, then it is determined that the conditions for vehicle height control being carried out for the front left wheel do not hold, and control proceeds to the vehicle height control processing for the front right wheel in step 183.

If on the other hand a decision is made in step 390 that the vehicle height S exceeds the lowering control starting vehicle height SDWS1, then control proceeds to step 400, and the vehicle height control valve 14FL for the front left wheel and the air solenoid valve 24 are energized and both valves thus opened, whereby lowering control to lower the vehicle body at the front left wheel is started, and next control proceeds to step 410, and the lowering control flag FDW1 is set.

When the lowering control flag FDW1 is set in step 410 in this way, or when a decision was made in step 380 that the lowering control flag FDW1 was already set, control proceeds to step 420, and a decision is made as to whether the vehicle height S detected in step 300 is below a lowering control ending vehicle height SDWE1 which is set to be somewhat lower than the lowering control starting vehicle height SDWS1. In step 420, if a decision is made that the vehicle height S is not less than the lowering control ending vehicle height SDWE1, in order that lowering control is continued for the front left wheel, IG/ON vehicle height control processing is ended.

On the other hand, in step 420, if a decision is made that the vehicle height S has fallen below the lowering control ending vehicle height SDWE1, the conditions for ending vehicle height control of the front left wheel hold, and control proceeds to step 430, and the energizing of the vehicle height control valve 14FL and the air solenoid valve 24 is stopped and both valves are closed, whereby lowering control is ended, and next in step 440 the lowering control flag FDW1 is reset, after which control proceeds to the vehicle height control processing for the front right wheel in step 183.

Next the IG/OFF vehicle height control processing executed in step 250 above is described.

This IG/OFF vehicle height control processing carries out vehicle body lowering control so that the mean values of the front left wheel vehicle height, the front right wheel vehicle height and the rear wheel vehicle height are not more than predetermined upper limit vehicle height values, and in the same way as the IG/ON vehicle height control processing, as shown in FIG. 6(a), first in step 251 a decision is made as to whether vehicle height control is currently being carried out, and if vehicle height control is not being carried out, following a predetermined order of priority the vehicle height control processing for each wheel or wheels is carried out (steps 252, 253 and 254), whereas if vehicle height control is already being carried out, decisions are made as to which of the front left wheel, the front right wheel or the rear wheels vehicle height control is being carried out for (steps 255 and 256), and control proceeds to the vehicle height control processing for the wheel or wheels for which vehicle height control is being carried out.

Again, in the IG/OFF vehicle height control processing, in the vehicle height control processing carried out in steps 252 to 254, when the vehicle height control is being carried out for a particular wheel or wheels, the IG/OFF vehicle height control processing ends therewith, so that moving from step 252 to step 253 or from step 253 to step 254 occurs only when vehicle height control is not actually being carried out for the front left wheel or the front right wheel.

Next the vehicle height control processing for the respective wheels carried out in these steps 252 to 254 is described, as in the IG/ON vehicle height control processing described above taking the vehicle height control for the front left wheel (FL) as an example, and with reference to the flowchart shown in FIG. 6(b).

As shown in FIG. 6(b), when the IG/OFF vehicle height control processing is started, first in step 500, based on the data detected by the vehicle height sensor 32FL, the vehicle height S at the front left wheel position is detected, and control proceeds to step 510. In step 510, a decision is made from the IG/OFF control flag FDW2 which is to be set in the processing below when IG/OFF lowering control is started as to whether IG/OFF lowering control is being carried out at present for the front left vehicle wheel. If the IG/OFF control flag FDW2 is in the reset state, and IG/OFF lowering control of the vehicle body is not being carried out, then control proceeds to step 520, and a decision is made as to whether the vehicle height S detected in step 500 is above an IG/OFF control starting vehicle height SDWS2 which is set to be a value higher still than the IG/ON lowering control starting vehicle height SDWS1, and if the vehicle height S is not more than the IG/OFF control starting vehicle height SDWS2, a determination is made that the conditions for carrying out vehicle height control for the front left wheel do not hold, and control proceeds to step 253 for front right wheel vehicle height control processing.

If on the other hand a decision is made in step 520 that the vehicle height S exceeds the IG/OFF control starting vehicle height SDWS2, then control proceeds to step 530, and the vehicle height control valve 14FL for the front left wheel and the air solenoid valve 24 are energized and both valves thus opened, whereby lowering control to lower the vehicle body at the front left wheel is started, and next control proceeds to step 540, and the IG/OFF control flag FDW2 is set.

When the lowering control flag FDW2 is set in step 540 in this way, or when a decision was made in step 510 that the lowering control flag FDW2 was already set, control proceeds to step 550, and a decision is made as to whether the vehicle height S detected in step 500 is below an IG/OFF control ending vehicle height SDWE2 which is set to be somewhat lower than the IG/OFF control starting vehicle height SDWS2. In step 550, if a decision is made that the vehicle height S is not less than the IG/OFF control ending vehicle height SDWE2, in order that lowering control is continued, IG/OFF vehicle height control processing is ended.

On the other hand, in step 550, if a decision is made that the vehicle height S has fallen below the IG/OFF control ending vehicle height SDWE2, the conditions for ending vehicle height control of the front left wheel hold, and control proceeds to step 560, and the energizing of the vehicle height control valve 14FL and the air solenoid valve 24 is stopped and both valves are closed, whereby IG/OFF lowering control is ended, and next in step 560 the IG/OFF control flag FDW2 is reset, after which control proceeds to the vehicle height control processing for the front right side in step 253.

In the embodiment of the vehicle height control device described above, when the ignition switch 28 is in the on position, IG/ON vehicle height control processing is carried out. This IG/ON vehicle height control processing is carried out for each of the front left wheel, the front right wheel, and the rear wheels, following the sequence shown as an example in FIG. 7, where at time t1 the vehicle height S goes above the lowering control starting vehicle height SDWS1 which is the upper limit for the control target, whereupon the vehicle body is lowered during the period until the vehicle height S reaches the lowering control ending vehicle height SDWE1. When at time t2 the vehicle height S lowers below the raising control starting vehicle height SUPS which is the lower limit for the control target, whereupon the vehicle body is raised until the vehicle height S reaches the raising control ending vehicle height SUPE, so that when the ignition is on the vehicle height at each vehicle wheel position is controlled within the range determined by the raising control starting vehicle height SUPS and the lowering control starting vehicle height SDWS1, and the desired vehicle body attitude is maintained.

Next, also referring to FIG. 7, when the vehicle is operated with the ignition switch being kept on, the vehicle height control is carried out to maintain the vehicle height normally within a range between an upper limit value SDWE1 and a lower limit value SUPE by actuating the vehicle height adjustment means if the vehicle height increases above an upper control starting limit value SDWS1 or lowers below a lower control starting limit value SUPS as at t1 or t2, respectively. When the ignition switch 28 is turned from on to off at time t3, until a certain period T1 has elapsed, IG/OFF vehicle height control processing is carried out. In this IG/OFF vehicle height control processing, as for IG/ON vehicle height control processing, processing is carried out for each of the front left wheel, the front right wheel, and the rear wheels, as shown by the solid line in FIG. 7, where at time t4 the vehicle height S exceeds the IG/OFF control starting vehicle height SDWS2, whereupon the vehicle body is lowered until the vehicle height S reaches the IG/OFF control ending vehicle height SDWE2. A shown in the diagram, the IG/OFF control starting vehicle height SDWS2 and control ending vehicle height SDWE2 are set to larger values than the IG/ON lowering control starting vehicle height SDWS1 and lowering control ending vehicle height SDWE1. Therefore at the end of IG/OFF vehicle height control, even if for example at time t5 the load on the vehicle body is increased, the vehicle height is not excessively reduced.

Figure 7:
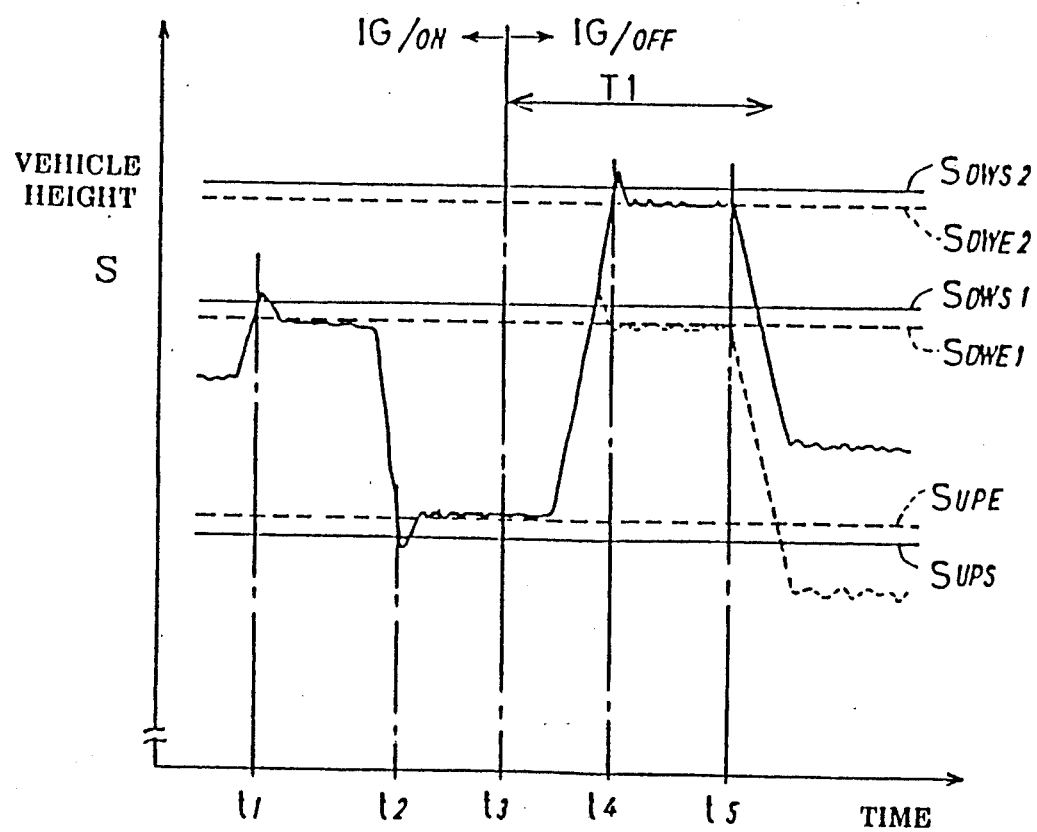
FIG. 7 is a diagram illustrating the operation of the vehicle height control processing by the flowcharts in FIGS. 4–6.

In other words, in a conventional device the target vehicle height when carrying out IG/OFF vehicle height control (corresponding to the IG/OFF control starting vehicle height in the present embodiment) is the same as the IG/ON lowering control starting vehicle height, and therefore as shown by the broken line in FIG. 7, after the ignition is switched off, when the load on the vehicle is reduced by for example the passengers getting out, and the vehicle body rises, the vehicle body will be lowered to the target vehicle height when the ignition is on, and when the load on the vehicle is later increased by for example the passengers getting in, the vehicle height will be excessively reduced, and there is a possibility of the vehicle body grounding on a curbstone or similar, whereas with the present embodiment the IG/OFF control starting vehicle height is set to be a higher value than the IG/ON lowering control starting vehicle height, as a result of which lowering control when the ignition is off does not lower the vehicle body at the IG/ON lowering control starting vehicle height, and excessive lowering of the vehicle body when the load on the vehicle is increased after control has ended is prevented, thus protecting the vehicle body from curbstones and the like.

Furthermore, since the IG/OFF control starting vehicle height is set to be larger than the IG/ON lowering control starting vehicle height, the frequency of carrying out IG/OFF vehicle height control is reduced, and therefore the power consumption from the battery can also be reduced.

Also, in the present embodiment the vehicle height sensor used to detect the vehicle height is constructed to output vehicle height data, fault data indicating faults in the light emitting diodes D1, D2 and D3, and a constant high level data value, as serial data, so that a single signal lead can be used, and compared with the conventional case in which a vehicle height sensor is used which outputs the various data values in parallel, the number of signal leads connecting the sensors and the control circuits can be reduced.

Furthermore, since a constant data value is also output from the sensor, if there is a break in the signal lead from the sensor to the control circuit, the electronic control circuit 6 will detect this, and erroneous vehicle height control will be avoided.

In the embodiment described above the vehicle height control processing for the respective wheels to be carried out in IG/ON and IG/OFF vehicle height control processing has been described taking the vehicle height control of the front left wheel as an example, and the other wheels have been described as being treated in the same way, but of course in carrying out vehicle height control processing which controls the average vehicle height of the rear wheels, the mean value of the vehicle heights obtained from the vehicle height sensors 32RL and 32RR provided for the left and right rear wheels is calculated as the vehicle height S, and when actually raising or lowering the vehicle body the vehicle height control valves 14RL and 14RR for the left and right rear wheels are activated simultaneously.

Figure 9:
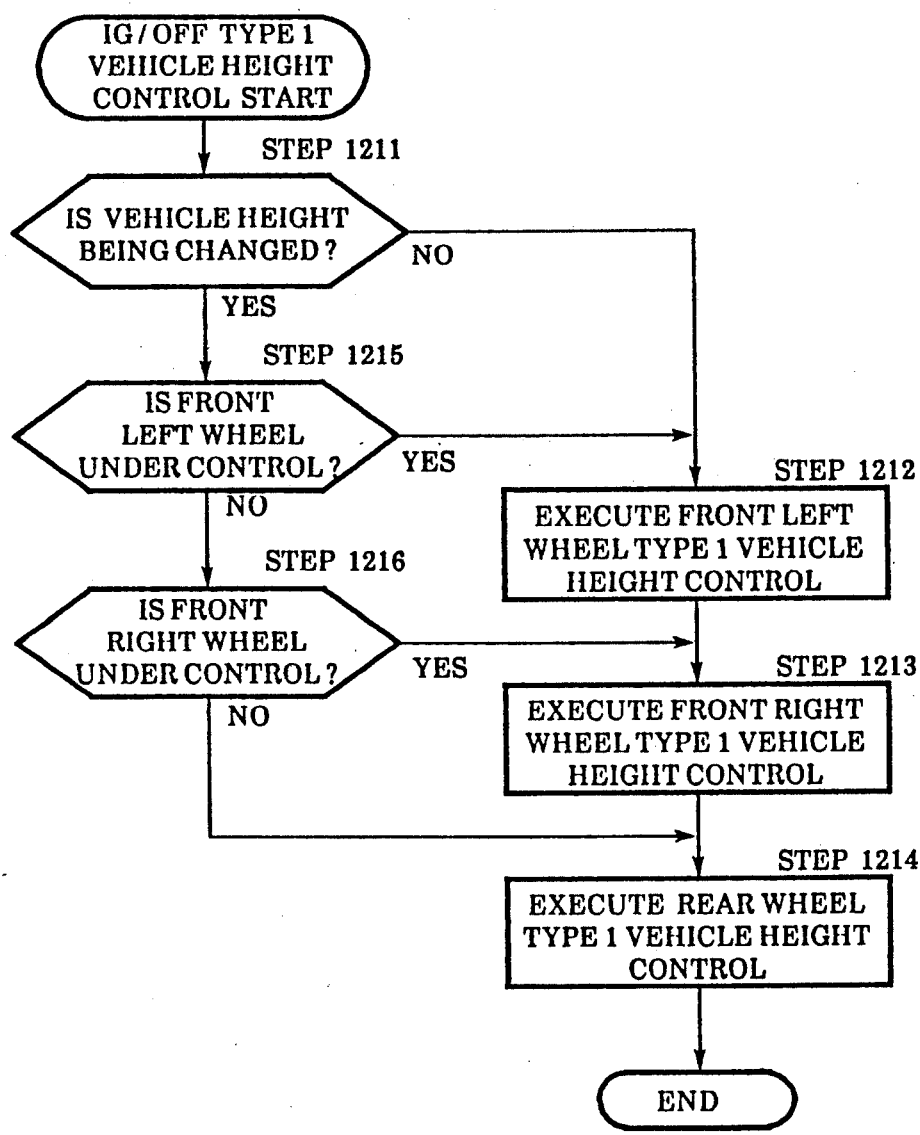
FIGS. 9 (a) and (b) are flowcharts explaining the IG/OFF vehicle height control processing carried out in step 1210 in FIG. 8.
Figure 9:
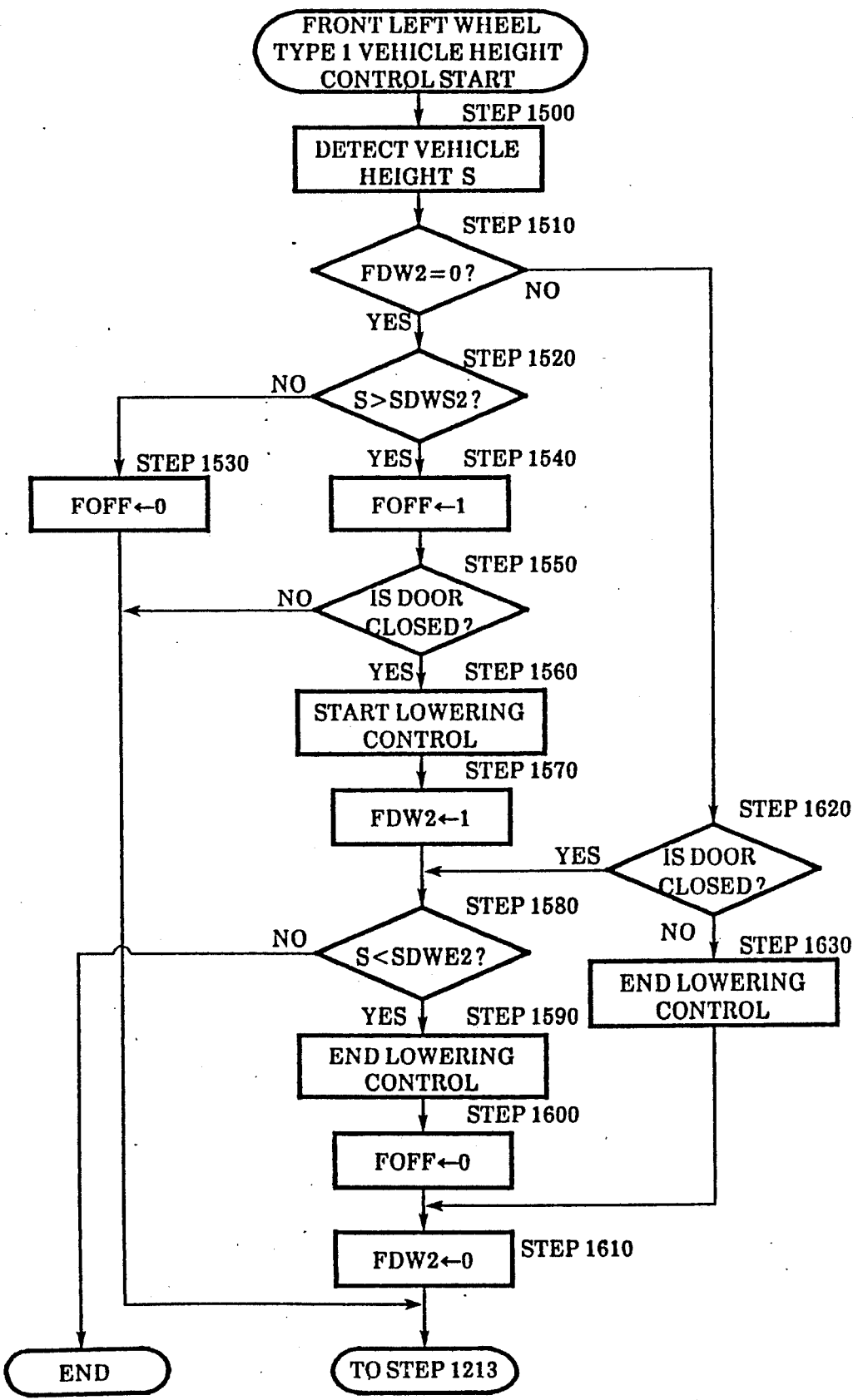
Figure 10:
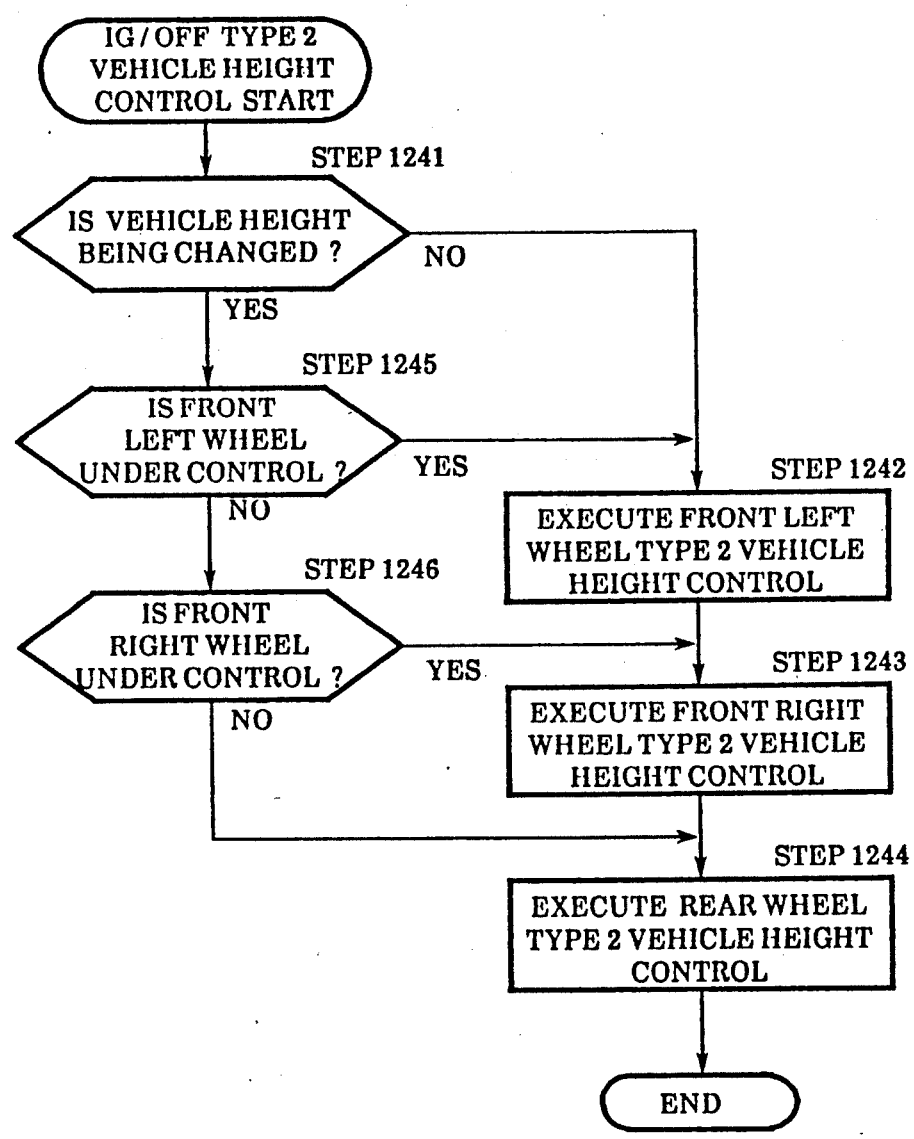
FIGS. 10 (a) and (b) are flowcharts explaining the IG/OFF vehicle height control processing carried out in step 1240 in FIG. 8.
Figure 10:
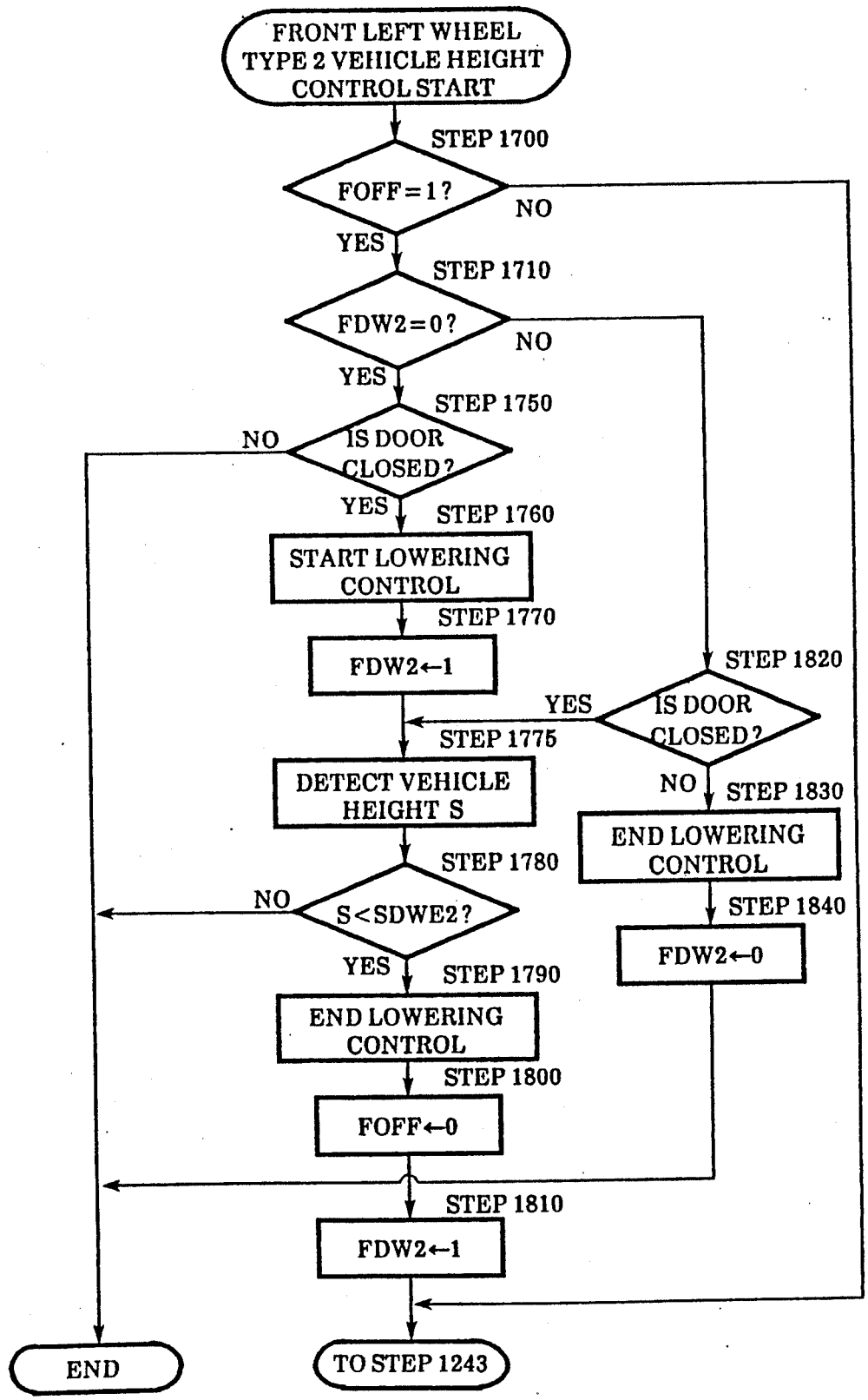

Next, another embodiment of the vehicle height control processing carried out to control the vehicle height by the electronic control circuit 6 according to the present invention will be described based on the flow-charts in FIG. 8 to FIG. 10.

Figure 8:
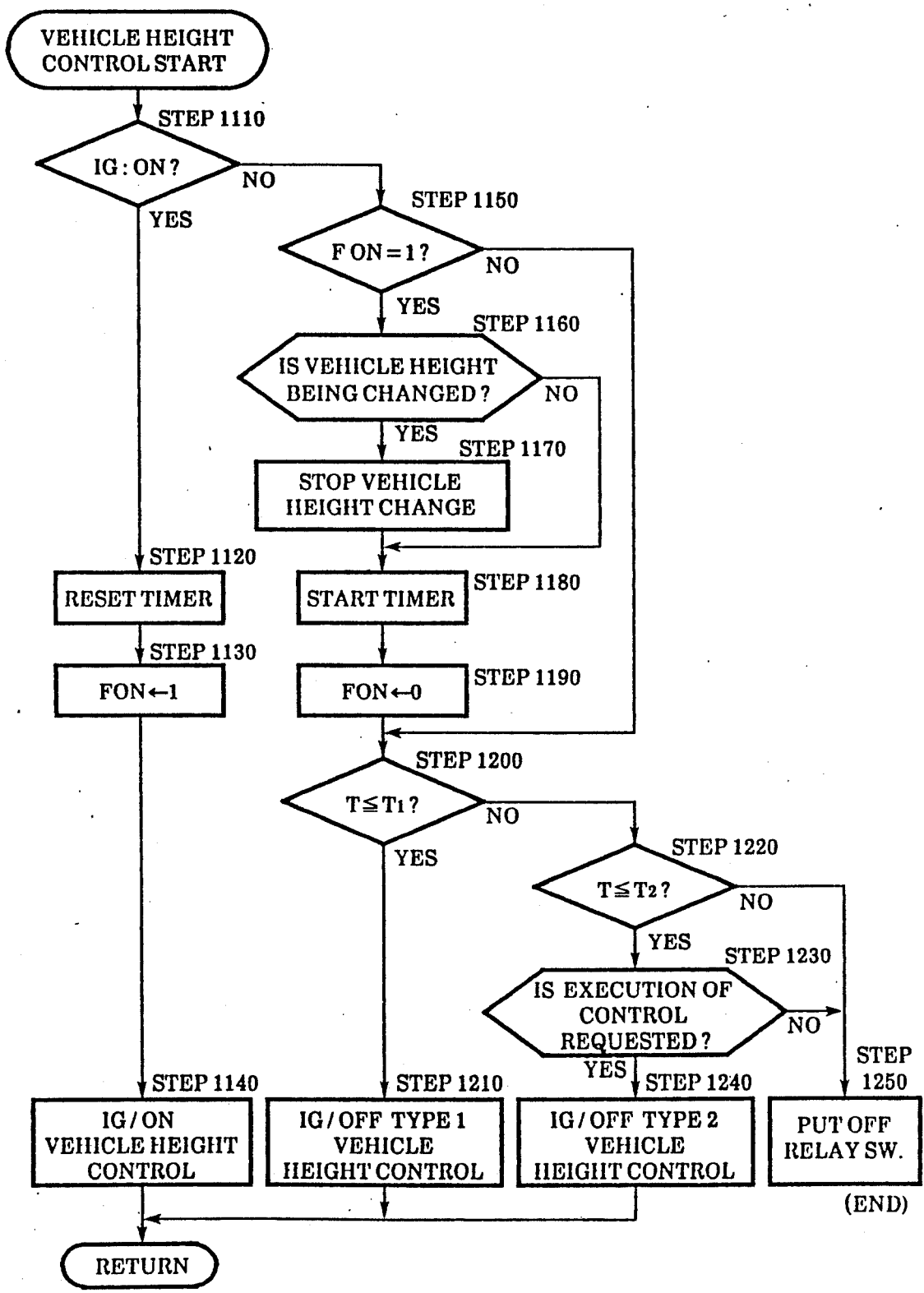
FIG. 8 is a flowchart explaining a second embodiment of the vehicle height control processing carried out in the electronic control circuit.

Referring to FIG. 8, which is similar to FIG. 4, when vehicle height control is started, first step 1110 is executed, and a decision is made based on the detection signal from the ignition sensor 36 as to whether the ignition switch 28 is on.

If the ignition switch 28 is on, then in step 1120 a timer T used to count elapsed time after the ignition switch 28 is turned off in the processing described below is cleared, next in step 1130 a flag FON which indicates that the ignition switch 28 is on is set, and next in step 1140 vehicle height control for when the ignition switch 28 is turned on (below this state is referred to as IG/ON), which is termed IG/ON vehicle height control processing, is carried out; this processing is then ended.

On the other hand, when a decision is made in step 1110 that the ignition switch 28 is not turned on, control proceeds to step 1150, and a decision is made as to whether or not the flag FON is set, that is whether the ignition switch 28 has been on up to now and the ignition switch 28 has immediately previously been switched from on to off.

In step 1150, when a decision is made that the flag FON is set, that is that the ignition switch 28 has immediately previously been switched from on to off, control next proceeds to step 1160, whereas in the contrary case control proceeds to step 1200 described below.

Next in step 1160, a decision is made as to whether or not vehicle height control is currently being carried out according to the IG/ON vehicle height control processing in step 1140, and when vehicle height control is being carried out, in step 1170 vehicle height control halt processing to stop this vehicle height control is carried out, and then control proceeds to step 1180, whereas if vehicle height control is not currently being carried out control proceeds directly to step 1180. In step 1180 the timer T which was reset in step 1120 when the ignition switch 28 was on, is started, and a count of the time elapsed after the ignition switch 28 was turned off is begun, then next in step 1190 the flag FON is reset and then control proceeds to step 1200.

In step 1200 a decision is made as to whether the value of the above timer T, in other words the elapsed time T since the ignition switch 28 was turned off, is not more than a certain preset period T1 (for example 3 minutes). If T is not more than T1, control proceeds to step 1210 where vehicle height control for the interval until the time T1 has elapsed from when the ignition switch 28 is turned off (below this state is referred to as IG/OFF), which is termed IG/OFF vehicle height control processing, is carried out by executing IG/OFF type 1 vehicle height control processing, and then this processing is ended.

On the other hand, if in step 1200 a decision is made that T is more than T1, then control proceeds to step 1220, and from the value of the timer T, a decision is made as to whether the time T elapsed after IG/OFF is not greater than a period T2 previously set to be a larger value than the decision period T1 (for example 30 minutes). Then if in step 1220 the decision is that T is not greater than T2, next control proceeds to step 1230, and a decision is made, based on a control request flag to be described later which in the IG/OFF type 1 vehicle height control processing executed in step 1210 is set when the execution conditions for vehicle height control after IG/OFF hold and is reset when vehicle height control after IG/OFF is completed thereafter, as to whether or not vehicle height control after IG/OFF is not yet completed, and the state is such that currently vehicle height control after IG/OFF should be executed, that is to say whether there is a request for vehicle height control execution after IG/OFF. In this step 1230, if a decision is made that there is an execution request for vehicle height control, next control proceeds to step 1240, and in order to complete vehicle height control after IG/OFF, IG/OFF type 2 vehicle height control processing is carried out, and this processing ends.

On the other hand, when in step 1220 it is determined that the period T2 has elapsed after IG/OFF, or when in step 1230 a decision is made that there is not an execution request for vehicle height control after IG/OFF, next control proceeds to step 1250, and by switching off the relay switch 30 which was turned on when starting up, the supply of power to the electronic control circuit 6 is cut off. In other words, by turning the relay switch 30 off, the consumption of battery power by operation of the electronic control circuit 6 is prevented.

The IG/ON vehicle height control processing carried out in step 1140 is done in such a way as to maintain a particular vehicle attitude, by controlling the mean vehicle height values of the front left wheel vehicle height, the front right wheel vehicle height and the rear wheel vehicle height to respective preset target value ranges, and in the same manner as shown in FIGS. 5(a) and 5(b) in the first embodiment described above. Therefore, further descriptions for this IG/ON vehicle height control processing will be omitted.

Next, the IG/OFF type 1 vehicle height control processing executed in step 1210 above is described with reference to the flow chart shown in FIG. 9 (a).

This IG/OFF type 1 vehicle height control processing carries out vehicle body lowering control so that the mean values of the front left wheel vehicle height, the front right wheel vehicle height and the rear wheel vehicle height are not more than predetermined upper limit vehicle height values, and in the same way as the IG/ON vehicle height control processing, first in step 1211 a decision is made as to whether vehicle height control is currently being carried out, and if vehicle height control is not being carried out, following a predetermined order of priority the vehicle height control processing for each wheel or wheels is carried out (steps 1212, 1213 and 1214), whereas if vehicle height control is already being carried out, decisions are made as to which of the front left wheel, the front right wheel or the rear wheels vehicle height control is being carried out for (steps 1215 and 1216), and control proceeds to the vehicle height control processing for the wheel or wheels for which vehicle height control is being carried out.

Again, in the IG/OFF type 1 vehicle height control processing, in the vehicle height control processing carried out in steps 1212 to 1214, when the vehicle height control is being carried out for a particular wheel or wheels, the IG/OFF vehicle height control processing ends therewith, so that moving from step 1212 to step 1213 or from step 1213 to step 1214 occurs only when vehicle height control is not actually being carried out for the front left wheel or the front right wheel.

Next, the vehicle height control processing for the respective wheels carried out in these steps 1212 to 1214 is described, as in the IG/ON vehicle height control processing described above taking the vehicle height control for the front left wheel (FL) as an example, and with reference to the flowchart shown in FIG. 9(b).

As shown in FIG. 9(b), when this vehicle height control processing is started, first in step 1500, based on the detection signal from the vehicle height sensor 32FL, the vehicle height S at the front left wheel position is detected, and control proceeds to step 1510. In step 1510, a decision is made from the IG/OFF control flag FDW2 which is to be set in the processing below when IG/OFF lowering control for the front left wheel is started as to whether IG/OFF lowering control is being carried out at present for the front left vehicle wheel. If the IG/OFF control flag FDW2 is in the reset state, and IG/OFF lowering control of the vehicle body for the front left wheel is not being carried out, then control proceeds to step 1520, and a decision is made as to whether the vehicle height S detected in step 1500 is above an IG/OFF control starting vehicle height SDWS2 which is set to be a value higher still than the IG/ON lowering control starting vehicle height SDWS1.

In this step 1520, if a decision is made that the vehicle height S is not more than the IG/OFF control starting vehicle height SDWS2, since execution of vehicle height control for the front left wheel is not required, in step 1530 the control request flag FOFF for this vehicle wheel is reset, and then control proceeds to step 1213 for front right wheel type 1 vehicle height control processing.

If on the other hand a decision is made in step 1520 that the vehicle height S exceeds the IG/OFF control starting vehicle height SDWS2, then in step 1540 the control request flag FOFF is set, and control proceeds to step 1550. In step 1550, a decision is made based on the detection signal from the door switch 34 as to whether or not the vehicle doors are closed. If they are not closed, control continues to the vehicle height control processing for the front right wheel in step 1213, and otherwise control proceeds to step 1560.

In step 1560, the vehicle height control valve 14FL for the front left wheel and the air solenoid valve 24 are energized and both valves thus opened, whereby lowering control to lower the vehicle body at the front left wheel is started, and next control proceeds to step 1570, and the IG/OFF control flag FDW2 is set, after which control proceeds to step 1580.

In step 1580 a decision is made as to whether the vehicle height S detected in step 1500 is below an IG/-OFF control ending vehicle height SDWE2 which is set to be somewhat lower than the IG/OFF control starting vehicle height SDWS2. In step 1580, if a decision is made that the vehicle height S is not less than the IG/OFF control ending vehicle height SDWE2, in order that lowering control is continued, IG/OFF type 1 vehicle height control processing is ended.

On the other hand, in step 1580, if a decision is made that the vehicle height S has fallen below the IG/OFF control ending vehicle height SDWE2, the conditions for ending vehicle height control of the front left wheel hold, and control proceeds to step 1590, and the energizing of the vehicle height control valve 14FL and the air solenoid valve 24 is stopped and both valves are closed, whereby IG/OFF lowering control is ended. Next in step 1600 the control request flag FOFF is reset, and in step 1610 the IG/OFF control flag FDW2 is reset, after which control proceeds to the type 1 vehicle height control processing for the front right wheel in step 1213.

In step 1510, if a decision was made that the IG/OFF control flag FDW2 was already set, and the lowering control for the front left wheel is currently being carried out, control proceeds to step 1620, and a decision is made based on the detection signal from the door switch 34 as to whether or not the vehicle doors are closed. If in step 1620 a decision is made that the doors are closed, control proceeds to step 1580 described above, and lowering control is continued, whereas if a decision is made that a door is open, control proceeds to step 1630, and by stopping the energizing of the vehicle height control valve 14FL and the air solenoid valve 24, the lowering control is interrupted, and then after the IG/OFF control flag FDW2 is reset in step 1610, control proceeds to the type 1 vehicle height control processing for the front right wheel in step 1213.

Next, the IG/OFF type 2 vehicle height control processing executed in step 1240 above is, in the same way as the vehicle height control processing for respective vehicle wheels described above, as shown in FIG. 10(a), first in step 1241 a decision is made as to whether vehicle height control is currently being carried out, and if vehicle height control is not being carried out, following a predetermined order of priority the vehicle height control processing for each wheel or wheels is carried out (steps 1242, 1243 and 1244), whereas if vehicle height control is already being carried out, decisions are made as to which of the front left wheel, the front right wheel or the rear wheels vehicle height control is being carried out for (steps 1245 and 1246), and control proceeds to the vehicle height control processing for the wheel or wheels for which vehicle height control is being carried out, and further, in the vehicle height control processing carried out in steps 1242 to 1244, when the vehicle height control is being carried out for a particular wheel or wheels, the IG/OFF vehicle height control processing ends therewith. Therefore, moving from step 1242 to step 1243 or from step 1243 to step 1244 occurs only when vehicle height control is not actually being carried out for the front left wheel or the front right wheel.

Next, the vehicle height control processing for the respective wheels carried out in these steps 1242 to 1244 is described, as in the vehicle height control processing described above taking the vehicle height control for the front left wheel (FL) as an example, and with reference to the flowchart shown in FIG. 10(b).

As shown in FIG. 10(b), when this IG/OFF type 2 vehicle height control processing is started, first step 1700 is executed, and a decision is made as to whether the control request flag FOFF which indicates a request for vehicle height control for the front left wheel is set. Then if the control request flag FOFF is in the reset state, and IG/OFF vehicle height control for the front left wheel is already completed, control proceeds to the type 2 vehicle height control processing for the front right wheel in step 1243.

On the other hand, when a decision is made in step 1700 that the control request flag FOFF is set, control proceeds to step 1710, and as in step 1510 described above, a decision is made based on the IG/OFF control flag FDW2 as to whether IG/OFF lowering control is being carried out at present for the front left vehicle wheel. If the IG/OFF control flag FDW2 is in the reset state, and IG/OFF lowering control of the vehicle body is not being carried out, then control proceeds to step 1750, and a decision is made based on the detection signal from the door switch 34 as to whether or not the vehicle doors are closed, and if the doors are not closed, IG/OFF type 2 vehicle height control processing ends immediately.

Next, in step 1750, if a decision is made that the doors are closed, as in step 1560 and step 1570 described above, lowering control to lower the vehicle body at the front left wheel is started (step 1760), and the IG/OFF control flag FDW2 which indicates this is set (step 1770). Next in step 1775, based on the detection signal from the vehicle height sensor 32FL, the vehicle height S at the front left wheel position is detected, and control proceeds to step 1780.

In step 1780, in the same way as in step 1580 above, a decision is made as to whether the vehicle height S detected above is below the IG/OFF control ending vehicle height SDWE2, and if a decision is made that S is not less than SDWE2, in order that lowering control is continued, IG/OFF type 2 vehicle height control processing is ended, whereas if S is less than SDWE2, in steps 1790 to 1810 processing similar to that in steps 1590 to 1610 above is carried out, that is to say that processing is executed in which IG/OFF lowering control is ended, the control request flag FOFF and the IG/OFF control flag FDW2 are reset, after which control proceeds to the type 2 vehicle height control processing for the front right wheel in step 1243.

In step 1710, if a decision was made that the IG/OFF control flag FDW2 was set, control proceeds to step 1820, and in the same way as in step 1620 above, a decision is made as to whether or not the vehicle doors are closed, and if the doors are closed, control proceeds to step 1775. If in step 1820 a decision is made that a door is open, control proceeds to step 1830, and in the same way as in step 1630, the IG/OFF lowering control is interrupted, then in step 1840 the IG/OFF control flag FDW2 is reset, after which the IG/OFF type 2 vehicle height control processing ends.

Figure 11:
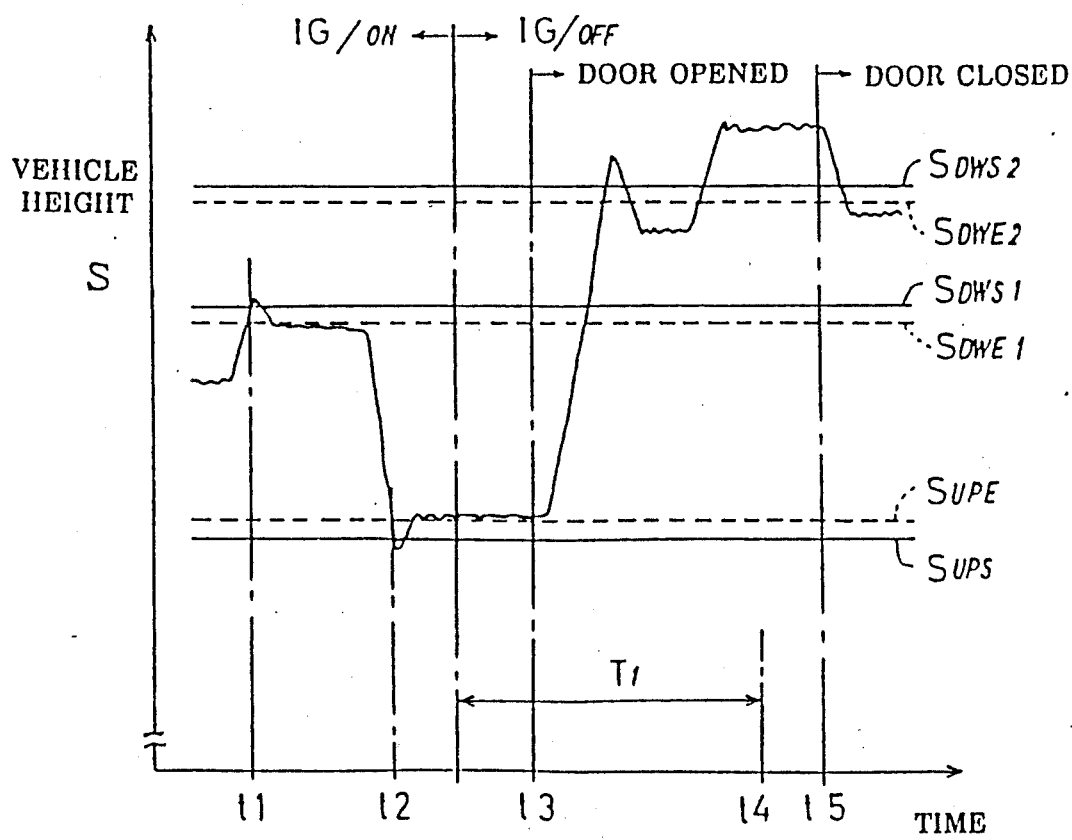
FIG. 11 is a diagram illustrating the operation of the vehicle height control processing by the flowcharts in FIGS. 8–10.

In the embodiment of the vehicle height control device described above, when the ignition switch 28 is in the on position, and the engine is running, IG/ON vehicle height control processing is carried out for each of the vehicle wheels following the sequence as shown in FIG. 11, where when the vehicle height S rises above the lowering control starting vehicle height SDWS1 at time point t1, the vehicle body is lowered until the vehicle height S is at highest the lowering control ending vehicle height SDWE1, and when the vehicle height S falls below the raising control starting vehicle height SUPS at time point t2, the vehicle body is raised until the vehicle height S is no lower than the raising control ending vehicle height SUPE. Therefore when the ignition is on, the vehicle height S at each of the vehicle wheel positions is controlled to be within the range defined by the raising control starting vehicle height SUPS and the lowering control starting vehicle height SDWS1.

Next, when the ignition is turned from on to off, and the engine is stopped, thereafter until the decision period T1 has elapsed, IG/OFF type 1 vehicle height control processing is carried out sequentially for each vehicle wheel, in which when the vehicle height S exceeds the IG/OFF control starting vehicle height SDWS2 the control request flag is set to represent the fact that lowering control execution conditions hold, and when these lowering control execution conditions hold, on condition that the doors and the trunk are closed, the vehicle body is lowered until the vehicle height S is not more than the IG/OFF control ending vehicle height SDWE2, and further, when this lowering control is completed the control request flag is reset.

When after turning off of the ignition switch the decision period T1 has elapsed and IG/OFF type 1 vehicle height control processing has ended, a decision is made, based on the control request flags for each vehicle wheel, as to whether IG/OFF lowering control is completed, and if this lowering control is not completed, on condition that the period T2 has not elapsed after ignition off, IG/OFF type 2 vehicle height control processing is carried out sequentially in the vehicle wheel positions for which lowering control is not completed, in such a way that when the doors and trunk are closed the vehicle body is lowered until the vehicle height S is not more than the IG/OFF control ending vehicle height SDWE2.

Therefore in this embodiment, as shown in FIG. 11, when the ignition is turned off, during the period (from t3 to t5) when a door or the trunk is opened and the vehicle height S is liable to fluctuate because of passengers getting out of the vehicle or goods being unloaded, even if the execution conditions for IG/OFF lowering control hold, lowering control is not carried out, and as a result frequent execution of IG/OFF vehicle height control is prevented.

Also, in the period after ignition off until the decision period T1 has elapsed, even when a door or the trunk is open, and lowering control is not carried out, a decision is made as to whether the execution conditions for lowering control hold, and when the decision period T1 has elapsed after ignition off, i.e. after time point t4, if the execution conditions for lowering control hold, thereafter when the door or the trunk was closed, lowering control will be carried out at time point t5. Therefore, even when the decision period T1 has elapsed after ignition off, lowering control allows the vehicle body attitude (appearance) of the parked vehicle to be improved.

Furthermore, the lowering control after the lapse of this decision period T1 is carried out on condition that a second period T2 has not elapsed after ignition off, and therefore a situation in which the lowering control is waiting indefinitely because of a door or the trunk the shutting of which has been forgotten and ensuing consumption of battery power occurs, is avoided.

It should be noted that in the embodiment described above the vehicle height control processing for the respective wheels to be carried out in IG/ON and IG/OFF vehicle height control processing has been described taking the vehicle height control of the front left wheel as an example, and the other wheels have been described as being treated in the same way, but of course in carrying out vehicle height control processing which controls the average vehicle height of the rear wheels, the mean value of the vehicle heights obtained from the vehicle height sensors 32RL and 32RR provided for the left and right rear wheels is calculated as the vehicle height S, and when actually raising or lowering the vehicle body the vehicle height control valves 14RL and 14RR for the left and right rear wheels are activated simultaneously.

Although the invention has been described in the above with respect to some particular embodiments thereof, it will be understood by those skilled in the art that various modifications are possible with respect to these embodiments within the scope of the present invention.

We claim:

1. A vehicle height control device comprising:
   a vehicle height adjustment means disposed between a vehicle body and a vehicle wheel to be capable of raising and lowering the body relative to the wheel for adjustment of vehicle height;
   a vehicle height detection means for detecting the vehicle height of the body relative to the wheel;
   a switch state detection means for detecting on and off states of an ignition switch of the vehicle; and
   an operation control means which operates said vehicle height adjustment means so that, when the ignition switch is detected as being in the on state by said switch state detection means, the vehicle height detected by said vehicle height detection means is within a range of vehicle height determined by a first upper and a first lower limit value, and when the ignition switch is detected as being in the off state by said switch state detection means, within a first period thereafter, the vehicle height detected by said vehicle height detection means is lowered, if it is higher than a second predetermined upper limit value which is higher than said first upper limit value, toward a second predetermined lower limit value which is higher than the first upper limit value.

2. A vehicle height control device comprising:
   a vehicle height adjustment means disposed between a vehicle body and a vehicle wheel to be capable of raising and lowering the body relative to the wheel for adjustment of vehicle height;
   a vehicle height detection means for detecting the vehicle height of the body relative to the wheel;
   a switch state detection means for detecting on and off states of an ignition switch of the vehicle; and
   an operation control means which operates said vehicle height adjustment means so that, when the ignition switch is detected as being in the on state by said switch state detection means, the vehicle height detected by said vehicle height detection means is within a range of vehicle height determined by a first upper and a first lower limit value, and when the ignition switch is detected as being in the off state by said switch state detection means, within a first period thereafter, the vehicle height detected by said vehicle height detection means is lowered, if it is higher than a second predetermined upper limit value which is higher than said first upper limit value; and
   an open and closed state detection means which detects open and closed states of an opening and closing member for selectively communicating interior and exterior of the vehicle, wherein said operation control means suspends operation of said vehicle height adjustment means when said open and closed states detection means is detecting an open state of said opening and closing member, and operates said vehicle height adjustment means, when thereafter said open and closed state detection means detects a closed state of said opening and closing member within a second period which is longer than said first period from an instant of switching off of the ignition switch, so that the vehicle height detected by said vehicle height detection means is lowered if it is higher than said second upper limit value.

3. A vehicle height control device according to claim 1, wherein said first period is determined to be of the order of 3 minutes.

4. A vehicle height control device comprising:
   a vehicle height adjustment means disposed between a vehicle body and a vehicle wheel to be capable of raising and lowering the body relative to the wheel for adjustment of vehicle height;
   a vehicle height detection means for detecting the vehicle height of the body relative to the wheel;
   a switch state detection means for detecting on and off states of an injection switch of the vehicle;
   an operation control means which operates said vehicle height adjustment means so that, when the ignition switch is detected as being in the on state by said switch state detection means, the vehicle height detection by said vehicle height detection means is within a range of vehicle height determined by a first upper and a first lower limit value, and when the ignition switch is detected as being in the off state by said switch state detection means, within a first period thereafter, the vehicle height detected by said vehicle height detection means is lowered, if it is higher than a second predetermined upper limit value which is higher than said first upper limit value; and
   an open and closed state detection means which detects open and closed states of an opening and closing member for selectively communicating interior and exterior of the vehicle, wherein said operation control means suspends operation of said vehicle height adjustment means when said open and closed states detection means is detecting an open state of said opening and closing member, and operates said vehicle height adjustment means, when thereafter said open and closed state detection means detects a closed state of said opening and closing member within a second period which is longer than said first period from an instant of switching off of the ignition switch, so that the vehicle height detected by said vehicle height detection means is lower if it is higher than said second upper limit value,
   wherein said second period is determined to be of the order of 30 minutes.

* * * * *